United States Patent [19]

Tiemann

[11] Patent Number: 4,473,837
[45] Date of Patent: Sep. 25, 1984

[54] SYSTEM FOR ENCODING AND DECODING VIDEO SIGNALS

[75] Inventor: Jerome J. Tiemann, Schenectady, N.Y.

[73] Assignee: General Electric Company, Schenectady, N.Y.

[21] Appl. No.: 383,067

[22] Filed: May 28, 1982

[51] Int. Cl.³ .............................. H04N 9/32
[52] U.S. Cl. .................. 358/12; 358/133; 358/134
[58] Field of Search ............ 358/12, 133, 134, 114, 358/119, 141, 312, 313

[56] References Cited

U.S. PATENT DOCUMENTS

| | | | |
|---|---|---|---|
| 2,906,816 | 9/1959 | Kretzmer | 358/134 |
| 3,825,677 | 7/1974 | Krasprzak | 178/6.8 |
| 3,982,063 | 9/1976 | Brown et al. | 178/6 |

FOREIGN PATENT DOCUMENTS

| | | | |
|---|---|---|---|
| 2645016 | 4/1977 | Fed. Rep. of Germany | 358/136 |
| 2701649 | 7/1978 | Fed. Rep. of Germany | 358/12 |

OTHER PUBLICATIONS

Robert B. Dome, Spectrum Utilization in Color Television, Proc. IEEE, Oct. 1951, p. 1326.

*Primary Examiner*—Michael A. Masinick
*Assistant Examiner*—Erin A. McDowell
*Attorney, Agent, or Firm*—Julius J. Zaskalicky; James C. Davis, Jr.; Marvin Snyder

[57] ABSTRACT

A system is described which makes use of the fact that in a raster scanned television system a high degree of correlation exists both in the luminance and in the chrominance signals of a pair of adjacent lines. Because of this correlation, the difference between the luminance signals of the two lines is usually much smaller than the luminance signal of either line alone, and requires less bandwidth. A luminance carrier is amplitude modulated by the average value of two adjacent lines, while the phase of the carrier is modulated by the difference of two adjacent lines. The bandwidth of the resulting signal is comparable to that of a carrier that is amplitude modulated by a single raster line. Since two lines of information are being transmitted, however, it would be possible to take twice as much time to transmit them as when only a single line is being transmitted. Stretching the time axis in this way results in a factor of about two reduction in bandwidth. Also, as the eye has very poor resolution for color, a simple average of the chrominance signal is used for both hue and saturation. A chrominance carrier is amplitude modulated by the average value of two adjacent hue lines, while the phase of the carrier is modulated by the average of two adjacent color saturation lines. After synchronous demodulation of the carriers, inverse operations are utilized to reconstitute the luminance and chrominance signals.

19 Claims, 25 Drawing Figures

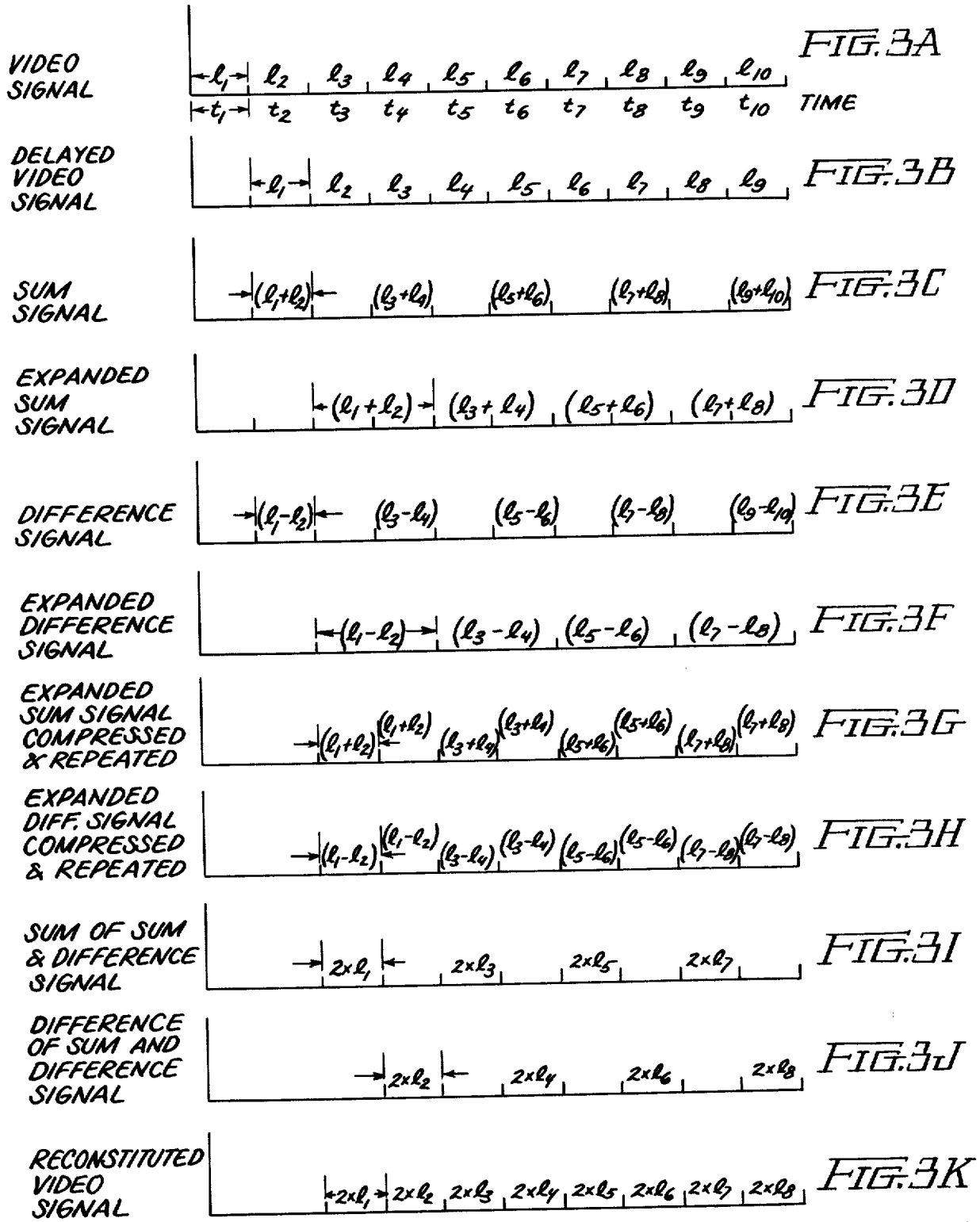

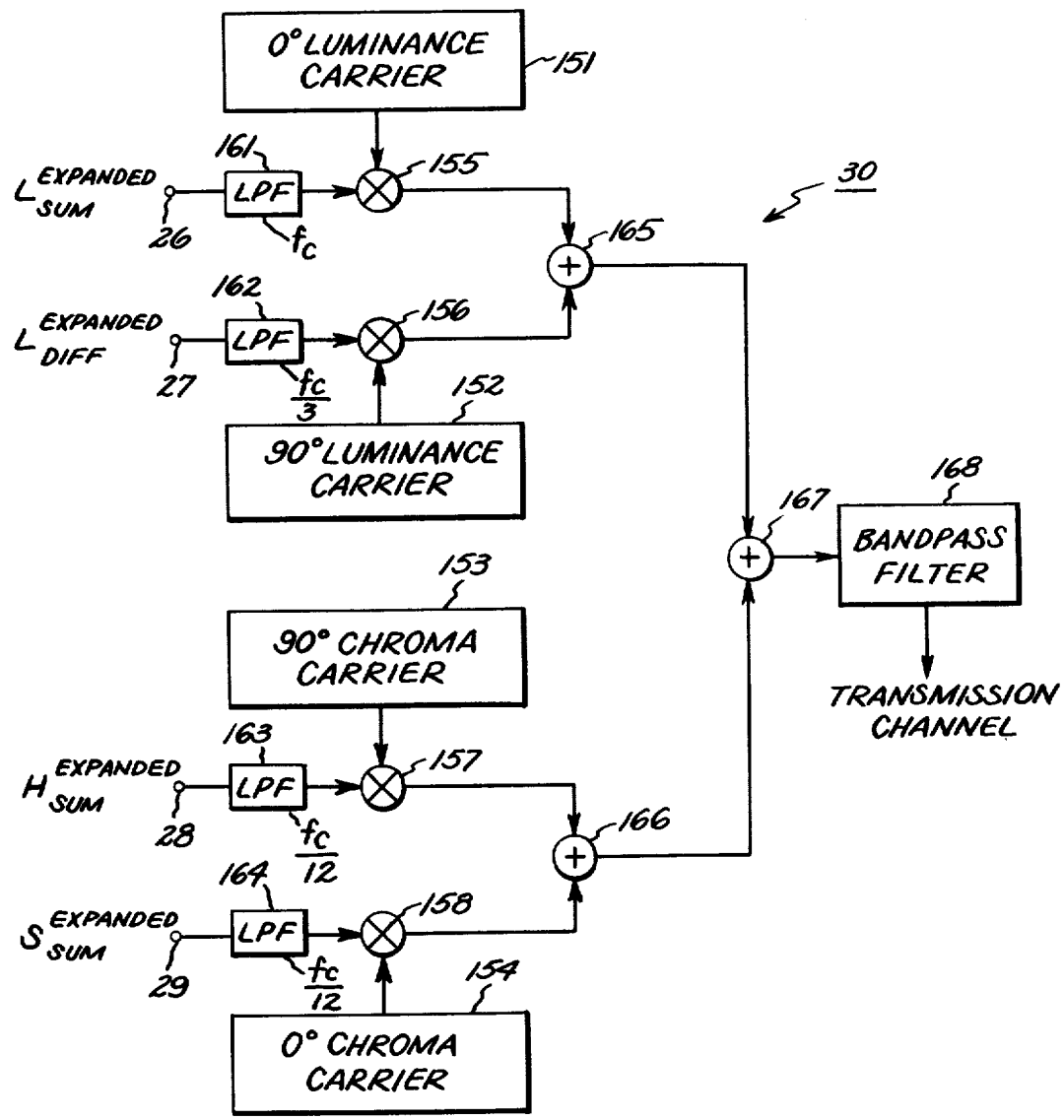

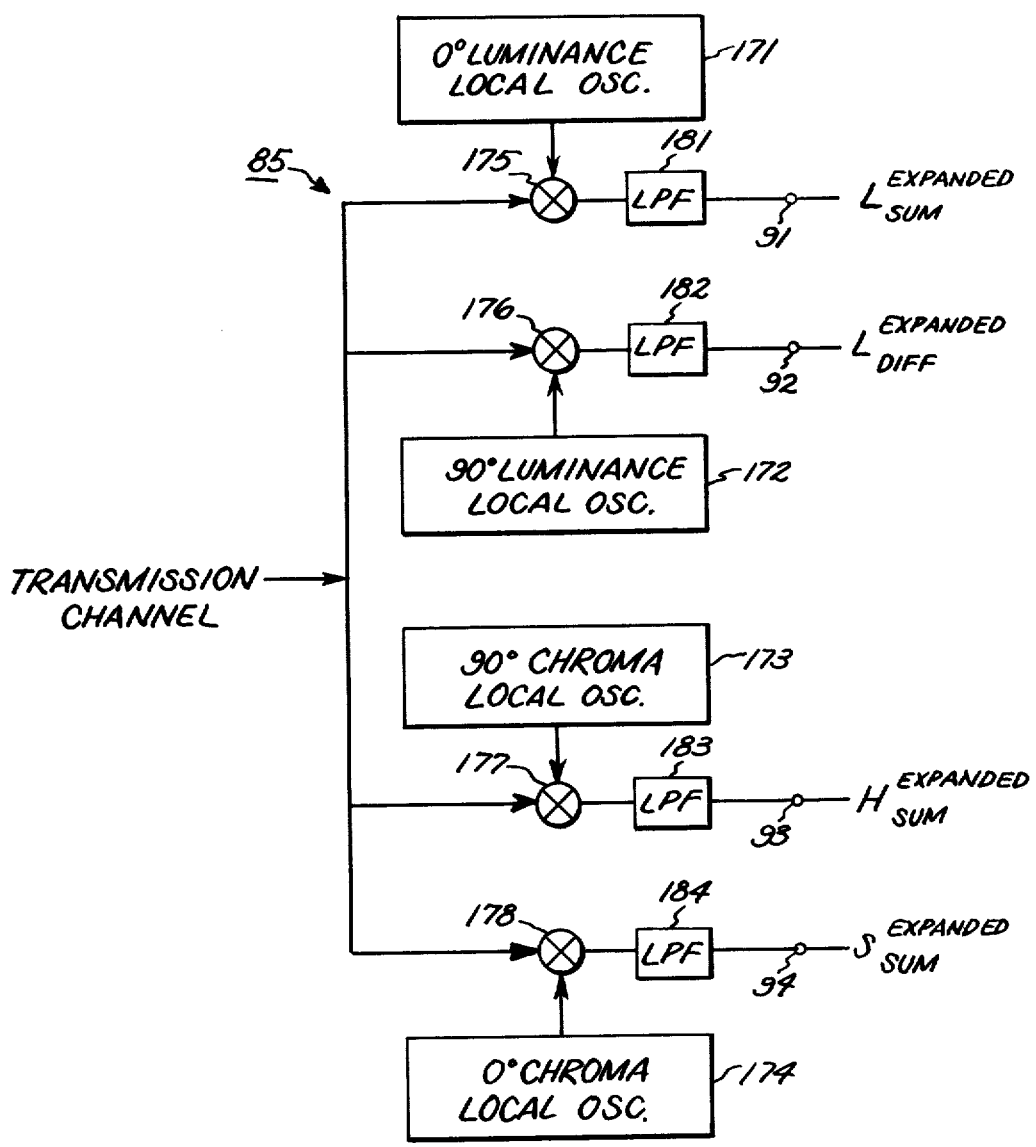

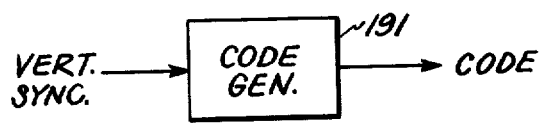
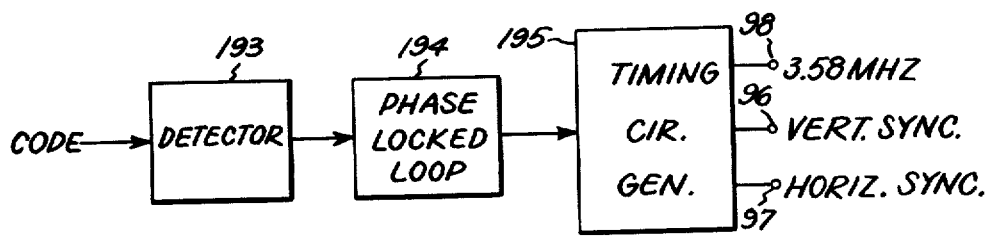
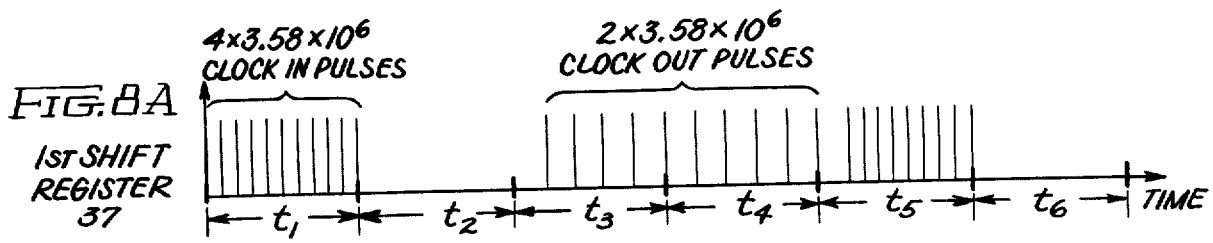
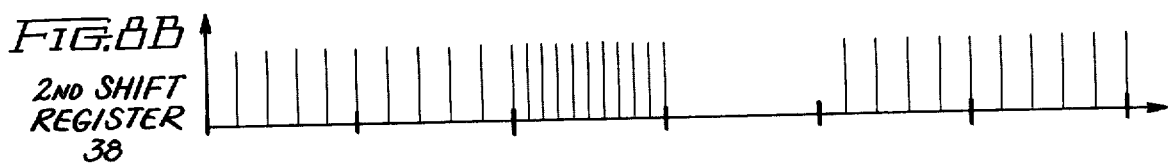
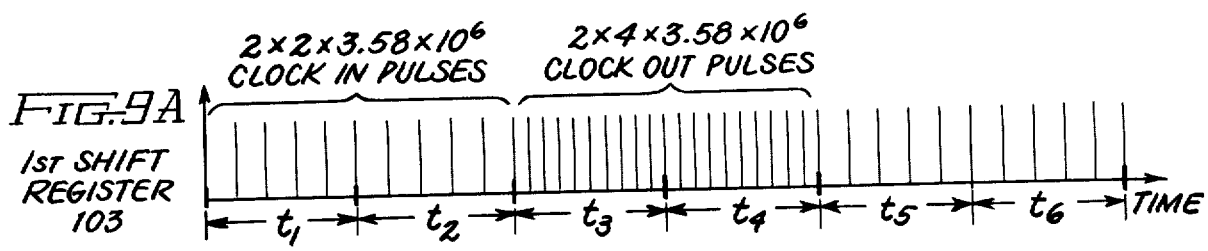
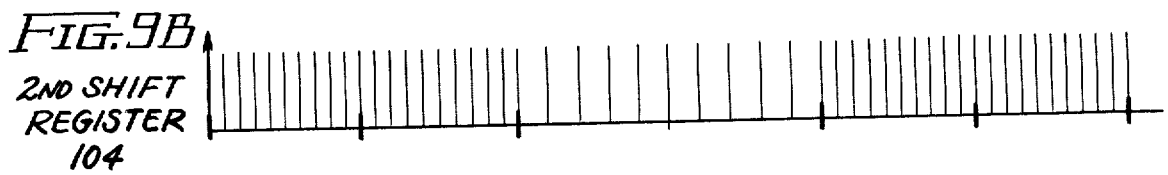

SYSTEM FOR ENCODING AND DECODING VIDEO SIGNALS

The present invention relates to a system for encoding and decoding video signals to reduce the bandwidth required for the transmission thereof over a transmission channel or the storage thereof in a storage medium.

In a raster scanned television system, the correlation in the horizontal or raster scanned direction automatically results in a low bandwidth signal. Also, a high degree of correlation exists between lines in the vertical direction. Prior art systems of bandwidth reduction converted each pixel to a digital value of a predetermined number of bits with each pixel being assigned the same number of bits. Bandwidth was reduced by reducing the number of bits per pixel by relatively complex digital processes such as transform coding, adaptive differential pulse code modulation, etc. The resulting digital signal was transmitted in digital form. Such systems required large bandwidths, or with reduced bandwidth picture quality was impaired, unless relatively costly processing was utilized.

The present invention takes advantage of the natural correlation in a television picture in the horizontal and vertical directions for bandwidth reduction without noticeable immpairment of the reproduced picture. This is accomplished by processing the television signal for bandwidth reduction in particular ways and transmitting it entirely in the analog domain; however parts of the process can be performed in the digital domain, if desired.

An object of the present invention is to reduce the bandwidth required to send a single television signal.

Another object of the present invention is to provide a specific modulation method for sending two raster lines of a television luminance signal on a single sinusoidal carrier.

A further object of the present invention is to reformat a television signal so that it cannot be monitored by a conventional television receiver.

In carrying out the invention in a preferred embodiment thereof there is provided a luminance signal consisting of a plurality of successive lines consisting of a first set of alternate lines and a second set of alternate lines, each line having a duration of a first predetermined time. Means are provided for forming a plurality of lines of a sum signal, each line of the sum signal being the algebraic sum of a line of the first set of alternate lines delayed by the aforementioned first predetermined time and a successive line of the second set of alternate lines. Means are provided for forming a plurality of lines of a difference signal, each line of the difference signal being the algebraic difference of a line of the first set of alternate lines delayed by the aforementioned first predetermined time and a successive line of the second set of alternate lines. Means are provided for expanding the duration of each of the lines of the sum signal to a duration of a second predetermined time whereby the bandwidth thereof is reduced. The second predetermined time is set equal to twice the aforementioned first predetermined time. Means are provided for further limiting the bandwidth of the expanded sum signal to a first predetermined value. Means are provided for expanding the duration of each of the lines of the difference signal to a duration of the aforementioned second predetermined time, whereby the bandwidth thereof is reduced. Means are provided for further limiting the bandwidth of said expanded difference signal to a second predetermined value, said second predetermined value being less than said first predetermined value. Means are provided for transmitting each of the lines of the expanded sum signal to a transmission channel. Means are provided for transmitting each of the lines of the expanded difference signal to the transmission channel.

Means are provided for receiving each of the lines of the expanded and bandwidth limited sum signal from the transmission channel. Means are provided for compressing the duration of each of the lines of the expanded and bandwidth limited sum signal to a duration of said first predetermined time and for repeating each of said compressed lines. Means are provided for receiving each of the lines of the expanded and bandwidth limited difference signal from the transmission channel. Means are provided for compressing the duration of each of the lines of the expanded and bandwidth limited difference signal to a duration of said first predetermined time and for repeating each of said compressed lines. Means are provided for algebraically summing each line of a first set of alternate lines of the compressed and repeated sum signal and a respective line of a second set of alternate lines of the compressed and repeated difference signal to reconstitute a respective line of the first set of alternate lines of the luminance signal. Means are provided for algebraically subtracting each line of the second set of alternate lines of the compressed and repeated sum signal and a respective line of said first set of alternate lines of the compressed and repeated difference signal to reconstitute a respective line of the second set of alternate lines of the luminance signal.

The features which are believed to be characteristic of the present invention are set forth with particularity in the appended claims. The invention itself, both as to its organization and method of operation, together with further objects and advantages thereof may best be understood by reference to the following description taken in connection with the accompanying drawings in which:

Figure 1:
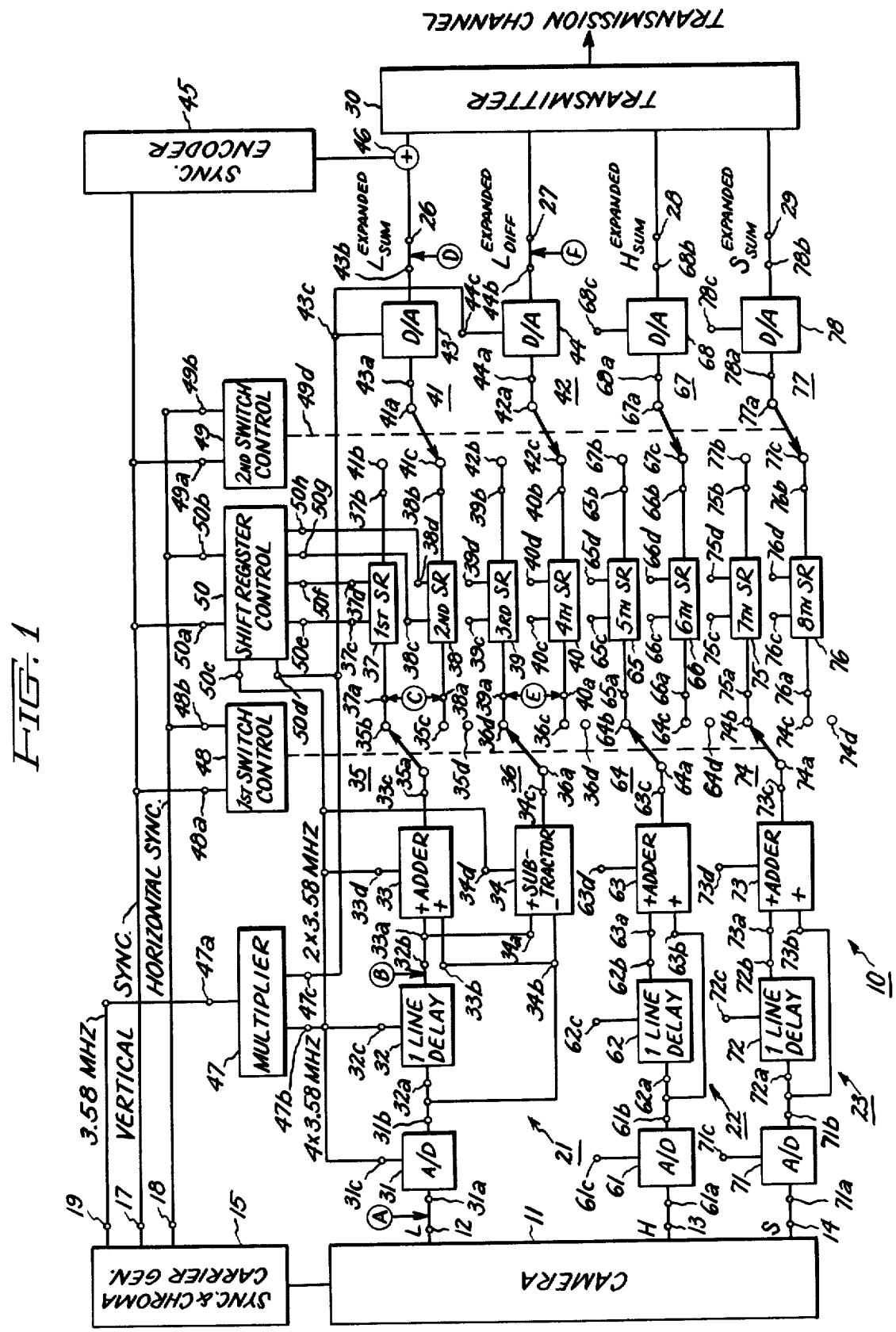
FIG. 1 shows a block diagram of apparatus for the processing of a video signal including luminance and chrominance components into a resultant signal of reduced bandwidth and for the transmission of the resultant signal over a transmission channel of reduced bandwidth.
Figure 2:
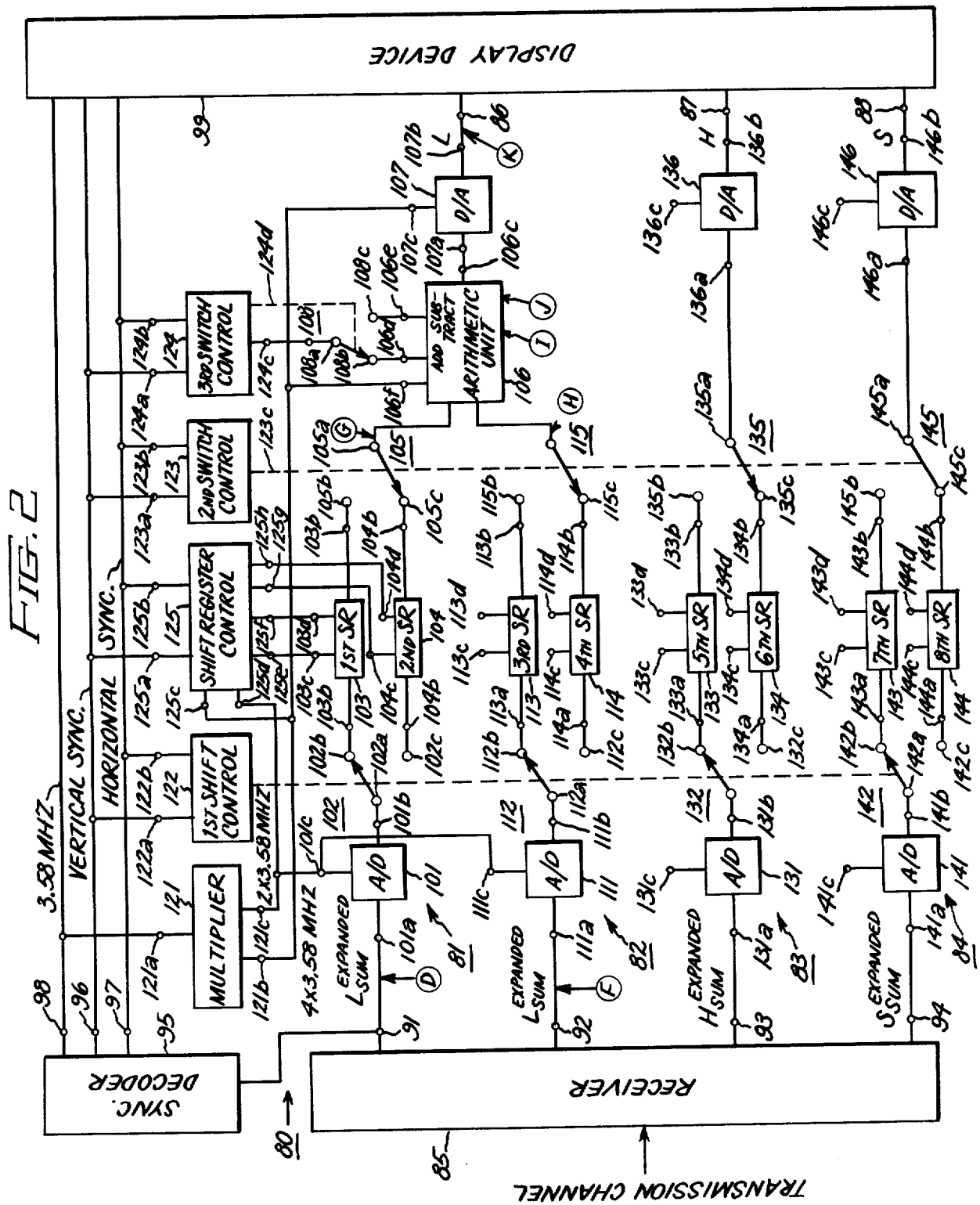
FIG. 2 shows a block diagram of apparatus for receiving the resultant signal from the transmission channel of the apparatus of FIG. 1 and for the processing thereof to reconstitute the original video signal.

FIGS. 3A–3K are diagrams of amplitude of the lines of the luminance component of the video signal, symbolically indicated by the literal designation l with a numeric subscript to indicate the position of the line in the sequence of the luminance lines of a field versus time drawn to a common time scale of signals occurring at various points in the apparatus of FIGS. 1 and 2. The point of occurrence of a signal of FIGS. 3A–3K in the block diagrams of FIGS. 1 and 2 is identified by a literal designation corresponding to the literal designation of the figure.

FIG. 3A shows several consecutive lines, $l_1$–$l_{10}$, of the luminance component of a video signal.

FIG. 3B shows the video signal of FIG. 3A delayed by a period of one line.

FIG. 3C shows the amplitude summation of successive nonoverlapping pairs of lines utilizing the video signal of FIG. 3A and the video signal of FIG. 3B. Successive lines are separated by a blank period equal to the period of a line.

FIG. 3D shows each of the lines of the sum signal of FIG. 3C expanded to occupy a period equal to the period of two lines of the video signal of FIG. 3A.

FIG. 3E shows the amplitude difference of successive nonoverlapping pairs of lines utilizing the video signal of FIG. 3A and the video signal of FIG. 3B. Successive lines are separated by a blank period equal to the period on one line.

FIG. 3F shows each of the lines of the difference signal of FIG. 3E expanded to occupy a period equal to the period of two lines of the video signal of FIG. 3A.

FIG. 3G shows each of the lines of the expanded sum signal of FIG. 3D which occupies the period of two lines of the video signal of FIG. 3A, compressed on occupy a period equal to the period of one line of the video signal of FIG. 3A and repeated.

FIG. 3H shows each of the lines of the expanded difference signal of FIG. 3E, which occupies the period of two lines of the video signal and FIG. 3A, compressed to occupy a period equal to the period of one line of the video signal of FIG. 3A and repeated.

FIG. 3I shows the sum of the sum signal of FIG. 3G and the difference signal of FIG. 3H. The odd numbered lines of the sequence of lines of FIG. 3A are recovered, each with twice the amplitude. Successive odd numbered lines are separated by a blank period equal to the period of one line.

FIG. 3J shows the difference of the sum signal of FIG. 3G and the difference signal of FIG. 3H. The even numbered lines of the sequence of lines of FIG. 1A are recovered, each with twice the amplitude. Successive even numbered lines are separated by a blank period equal to the period of one line.

FIG. 3K shows the combining of the sum signal of FIG. 3I and the difference signal of FIG. 3J to obtain a signal which is the reconstitution of the video signal of FIG. 1A.

FIG. 4 shows a block diagram of one form of the transmitter of FIG. 1 for modulating a first or luminance carrier with the expanded $L_{sum}$ signal of FIG. 1 in one phase and the expanded $L_{diff}$ signal of FIG. 1 in quadrature phase and for modulating a second or chroma carrier with the expanded $H_{sum}$ signal of FIG. 1 in one phase and the expanded $S_{sum}$ signal of FIG. 1 in quadrature phase.

FIG. 5 shows a block diagram of one form of the receiver of FIG. 2 for demodulating the first or luminance carrier carrier to recover the expanded $L_{sum}$ signal and the expanded $L_{diff}$ signal and for demodulating the second or chroma carrier to recover the expanded $H_{sum}$ signal and the expanded $S_{sum}$ signal.

FIG. 6 shows a block diagram of the sync encoder of FIG. 1.

FIG. 7 shows a block diagram of the sync decoder of FIG. 2.

FIGS. 8A and 8B are timing diagrams for the first and second shift registers of the transmitting station of FIG. 1.

FIG. 9A is a timing diagram for first and second shift registers of the receiving station of FIG. 2.

FIGS. 10A–10D are diagrams supplemental to the diagram of FIG. 2 showing in greater detail the structure of the shift registers thereof.

Referring now to FIG. 1 there is provided a transmitting station 10 including a camera or a video signal source 11 which provides at terminal 12 thereof a luminance signal such as shown in FIG. 3A consisting of a sequence or plurality of horizontal lines. A predetermined plurality of horizontal lines are constituted into a field and a pair of interlaced fields constitute a frame. Each field of information is obtained by scanning a image to be televised line-by-line. The camera 11 also provides at terminal 12 thereof a sequence of lines representing hue information of the scene being televised. The camera 11 further provides at terminal 14 thereof a sequence of lines representing color saturation information of the image being televised. A synchronizing signal and color carrier generator 15 provides timing information in the form of vertical and horizontal synchronization markers or pulses which mark the beginning of a field and the beginning of a line of video signal, respectively. The vertical synchronization pulses occurring at the rate of 60 cycles per second appear at terminal 17 and the horizontal synchronization pulses occurring at the rate of 15,750 cycles per second appear at terminal 18. The generator 15 also provides a chroma or color carrier of frequency 3.58 MHz (megahertz) which appears at terminal 19 thereof.

The apparatus 10 includes three processing channels 21, 22 and 23. Channel 21 processes the analog luminance, or L, signal at terminal 12 of the camera into an analog expanded $L_{sum}$ signal, shown in FIG. 3D, at terminal 26, and also an analog expanded $L_{diff}$ signal, shown in FIG. 3F, at terminal 27. Channel 22 processes the analog hue, or H, signal at terminal 13 into an analog expanded $H_{sum}$ signal at terminal 28. Channel 23 processes the analog saturation signal, or S, signal at terminal 14 into an analog expanded $S_{sum}$ signal at terminal 29. Although the processing is compatible with analog methods and the final result is an analog signal, the processing will be described in terms of a digital implementation.

First, the luminance channel 21 will be described. The luminance channel 21 comprises an input analog-to-digital converter 31, a one-line delay circuit 32, an adder 33, a subtractor 34, a first switch 35, a second switch 36, a first shift register 37, a second shift register 38, a third shift register 39, a fourth shift register 40, a third switch 41, a fourth switch 42, a first output digital-to-analog converter 43, and a second output digital-to-analog converter 44. The input analog-to-digital converter 31 has an input terminal 31a, an output terminal 31b consisting of eight output lines corresponding to 8 bits of a binary word and a control terminal 31c. The analog-to-digital digital converter 31 converts an analog luminance signal at input terminal 31a into a digital luminance signal at its output terminal 31b. Each line of the luminance signal is divided into 910 elements or values in response to a 4×3.58 clocking signal applied at control terminal 31c and each value has a resolution of 256 levels represented by eight bits. The one-line delay circuit 32 includes a shift register having eight channels and has an input terminal 32a consisting of eight input lines, each line connected to the input of a respective channel, an output terminal 32b consisting of eight lines, each line connected to the output of a respective channel, and a control or clocking terminal 32c consisting of eight lines, each line connected to a respective channel. The adder 33 has a pair of input terminals 33a and 33b, each consisting of eight input lines, an output terminal 33c consisting of eight output lines and a control terminal 33d. The subtractor 34 has a pair of input terminals 34a and 34b, each consisting of eight input lines, and output terminal 34c consisting of eight lines, and a control terminal 34d. The first switch 35 has a pole terminal 35a consisting of eight lines, a first contact terminal 35b consisting of eight lines, a second contact terminal 35c consisting of eight lines and a third contact terminal 35d unconnected to provide an unconnected position for the switch 35 for reasons to be described below. The second switch 36 has a pole terminal 36a consisting of eight lines, a first contact terminal 36b consisting of eight lines, a second contact terminal 36c consisting of eight lines and a third contact terminal 36d unconnected to provide an unconnected position for the switch 36 for reasons to be described below. The first shift register 37 has eight channels and has an input terminal 37a consisting of eight lines, each line being connected to the input of a respective channel, an output terminal 37b consisting of eight output lines, each line connected to the output of a respective channel, a control or clocking terminal 37c consisting of eight lines, each line connected to a respective channel for clocking the channels at one rate of 4×3.58 MHz, and a control or clocking terminal 37d consisting of eight lines, each line connected to a respective channel for clocking the channels at another rate of 2×3.58 MHz. The second shift register 38 is identical to first shift register 37 and has an input terminal 38a, and output terminal 38b, a pair of clocking control terminals 38c and 38d. The third shift register 39 is identical to first register and has an input terminal 39a, and output terminal 39b and a pair of clock control terminals 39c and 39d. The fourth shift register 40 is identical to the first shift register 37 and has an input terminal 40a, an output terminal 40b and a pair of clocking terminals 40c and 40d. The third switch 41 has a pole terminal 41a consisting of eight lines, a first contact 41b consisting of eight lines and a second contact terminal 41c consisting of eight lines. The fourth switch 42 has a pole terminal 42a consisting of eight lines, a first contact terminal 42b consisting of eight lines and a second contact terminal 42c consisting of eight lines. The first output digital-to-analog converter 43 has an input terminal 43a consisting of eight lines, an output terminal 43b and a clocking control terminal 43c. The second output digital-to-analog converter 44 has an input terminal 44a consisting of eight lines, an output terminal 44b and a clocking control terminal 44c.

The apparatus 10 also includes a multiplier 47 having an input terminal 47a and a pair of output terminals 47b and 47c. Input terminal 47a is connected to input terminal 19 at which color carrier signal of 3.58 MHz appears. At terminal 47b a clocking signal of four times the frequency of the color subcarrier signal is provided and at output terminal 47c a signal of two times the frequency of the color subcarrier signal is provided. Terminal 47b is connected to terminal 31c of analog-to-digital converter 31, to terminal 32c of one-line delay circuit 32, to terminal 33d of adder 33, to terminal 34d of subtractor 34, and to terminal 50c of shift register control 50. Terminal 47c is connected to terminal 50d of shift register control 50, to terminal 43c of digital-to-analog converter 43 and to terminal 44c of digital-to-analog converter 44. The apparatus also includes a first switch controller 48 having an input terminals 48a and 48b and having a linkage indicated by dotted line 48c linking the poles of switches 35 and 36 to control the position thereof, and a second switch controller 49 having a pair of input terminals 49a and 49b and having a linkage indicated by dotted line 49c linking the poles of switches 41 and 42 to control the position thereof. Terminals 48a and 49a are connected to terminal 17 at which vertical synchronization signals appear. Terminals 48b and 49b are connected to terminal 18 at which horizontal synchronization signals appear. The apparatus 10 also includes a shift register control 50 having input terminals 50a, 50b, 50c, and 50d, and output terminals 50e, 50f, 50g and 50h. Input terminals 50a, 50b, 50c and 50d are connected to terminals 17, 18 of sync generator 15 and terminals 47b and 47c of multiplier 47, respectively. Output terminals 50e, 50f, 50g and 50h are connected to terminals 37c, 37d of shift register 37, and terminals 38c and 38d of shift register 38, respectively. Also, while not shown for reasons of simplifying the drawing, output terminals 50e, 50f, 50g and 50h are also connected to terminals 39c, 39d of shift register 39, and terminals 40c and 40d of shift register 40, respectively.

The input terminal 31a of analog-to-digital converter 31 is connected to terminal 12 of camera 11. The output terminal 31b of the analog-to-digital converter 31 is connected to the input terminal 32a of one-line delay circuit 32. The output terminal 31b of the analog-to-digital converter 31 is also connected to input terminal 33b of adder 33 and input terminal 34a of subtractor 34. The output of one-line delay circuit 32 is connected to input terminal 33a of adder 33 and to input terminal 34a of subtractor 34. The output terminal 33c of adder 33 is connected to pole terminal 35a of switch 35. The output terminal 34c of the subtractor 34 is connected to pole terminal 36a of switch 36. First contact terminal 35b of switch 35 is connected to input terminal 37a of first shift register 37. Second contact terminal 35c of switch 35 is connected to input terminal 38a of second shift register 38. Third contact terminal 35d of switch 35 is unconnected. First contact terminal 36b of switch 36 is connected to input terminal 39a of third shift register 39. Second contact terminal 36c of switch 36 is connected to input terminal 40a of fourth shift register 40. The output terminal 37b of shift register 37 is connected to first contact terminal 41b of switch 41. Output terminal 38b of shift register 38 is connected to second contact terminal 41c of switch 41. The output terminal 39b of third shift register 39 is connected to first contact terminal 42b of switch 42. The output terminal 40b of fourth shift register 40 is connected to second contact terminal 42c of switch 42. The pole contact terminal 41a of switch 41 is connected to input terminal 43a of digital-to-analog converter 43. The pole contact terminal 42a of switch 42 is connected to input terminal 42a of digital-to-analog converter 44. The output terminal 43b of digital-to-analog converter 43 is connected to output terminal 26. The output terminal 44b of digital-to-analog converter 44 is connected to output terminal 27.

The operation of the luminance channel 21 of FIG. 1 will now be described in connection with FIGS. 3A–3F which show diagrams of amplitude, symbolically indicated, versus time drawn to a common time scale of signals occurring at various points in the system of FIG. 1. The point of occurrence of a signal of FIGS. 3A–3F is referenced in FIG. 1 by a literal designation corresponding to the literal designation of the figure reference. The analog signal appearing at terminal 12 is shown in FIG. 3A. FIG. 3A shows several consecutive lines $l_1$–$l_{10}$ of the video signal in which the amplitude of each line is symbolically indicated by the literal designation l with a subscript to indicate the position of the line in the sequence. The lines $l_1$, $l_3$, $l_5$, $l_7$, $l_9$, etc. form a first set of alternate lines. The lines $l_2$, $l_4$, $l_6$, $l_8$, $l_{10}$, etc. form a second set of alternate lines. The video signal of FIG. 3A is converted into digital format by the analog-to-digital converter 31. The video signal is delayed by the period of one line by the one line delay circuit 32. The delayed signal of FIG. 3B is applied to one terminal 33a of the adder 33 and to one terminal 34a of the subtractor 34. The undelayed video signal, shown at FIG. 3A, is applied to the other terminal 33b of the adder 33 and also to the other terminal 34b of the subtractor 34. Thus, at the output of the adder 33, a signal is obtained in digital format which is the sum of successive pairs of lines of the video signal and similarly at the output of subtractor 34 a video signal is obtained in digital format which is the difference of successive pairs of lines. The sequence of sums would be $l_1+l_2$, $l_2+l_3$, $l_3+l_4$, etc. and similarly the sequence of differences would be $l_1-l_2$, $l_2-l_3$, $l_3-l_4$, etc. In accordance with the present invention, the sequence of $l_1+l_2$, $l_3+l_4$, $l_5+l_6$, etc. and the sequence of $l_1-l_2$, $l_3-l_4$, $l_5-l_6$, etc. are utilized. The manner in which these sequences are selectively obtained will be readily apparent from the operation of the first, second, third and fourth shift registers to be described below.

The operation of switch 35 and switch 41 by switch control blocks 48 and 49 respectively, and the application of clock in and clock out pulses to the first and second shift registers 37 and 38 by shift register control 50 will now be described over a time period $t_1-t_4$ of four horizontal lines. Reference is made particularly to FIGS. 8A and 8B which show the time of application of clock in and clock out pulses to shift registers 37 and 38, respectively. During the time $t_1$ of a first horizontal line of video data, switch 35 is in its first position with terminal 35a connected to terminal 35b. Also, during time $t_1$, $4\times3.58$ MHz pulses are applied to terminal 37c of shift register 37 thereby clocking into the shift register 37 a line of video data, as shown in FIG. 8A. Also, during time $t_1$, switch 41 is in its second position with terminal 41a connected to terminal 41c. Also, during time $t_1$, $2\times3.58$ MHz pulses are applied to terminal 38d of shift register 38 thereby clocking out of shift register 38 into terminal 41a one-half of a line of video data previously clocked into this shift register, as shown in FIG. 8B.

During this time $t_2$ of a second horizontal line of video data, switch 35 is moved to its third position with terminal 35a connected to terminal 35d and hence disconnected from input terminals 37a and 38a of first and second shift registers 37 and 38. Also, during time $t_2$, no clock pulses are applied to either terminals 37c or 37d of shift register 37. Also, during time $t_2$ switch 41 remains in its second position and the $2\times3.58$ MHz pulses continue to be applied to terminal 38d of shift register 38 thereby clocking out of the shift register 38 into terminal 41a the other half of the line of video data previously clocked into this shift register.

During the time $t_3$ of a third horizontal line of video data, switch 35 is moved to its second position with terminal 35a connected to terminal 35c. Also, during time $t_3$, $4\times3.58$ MHz pulses are applied to terminal 38c of shift register 38 thereby clocking another line of video data into shift register 38. Also, during time $t_3$, switch 41 is in its first position with terminal 41a connected to terminal 41b. Also, during time $t_3$, $2\times3.58$ MHz pulses are applied to terminal 37d thereby clocking out of shift register 37 into pole terminal 41a one-half of a line of video data which had been clocked in during time $t_1$.

During time $t_4$ of a fourth horizontal line of video data, switch 35 is moved to its third position with terminal 35a connected to terminal 35d and hence disconnected from input terminals 37a and 38a of the first and second registers 37 and 38. Also, during time $t_4$, no pulses are applied to either terminals 38c or 38d of shift register 38. Also, during time $t_4$, switch 41 remains in its first position and $2\times3.58$ MHz pulses continue to be applied to terminal 37d of shift register 37 thereby clocking out of shift register 37 into terminal 41a the other half of the line of video data clocked in during time $t_3$. The cycle of operation is repeated during the next four horizontal line times $t_5-t_8$, etc. Thus, one line of video data is clocked into shift register 37 at a $4\times3.58$ MHz rate during one line time and is thereafter clocked out of shift register 37 at a $2\times3.58$ MHz rate, thereby stretching the time coordinate by a factor of 2. Two horizontal line times later, the same operation is repeated in shift register 38. Thus, at terminal 41a of switch 41 appears successive lines of video data, the time coordinate of which has been stretched by a factor of 2.

If the first line of video data at the output of adder 33 is the sum of the first and second lines of video applied at the input thereof, the second line of data at the output of adder 33 would be the sum of the second and third lines applied to the input thereof. As the next line of video data desired in accordance with the system of the present invention is the sum of the third and fourth lines, the disconnection of terminal 35a of switch 35 from terminals 35b and 35c in the manner explained above provides this result.

Thus, one portion of the $L_{sum}$ signal $(l_1+l_2)$ appears at terminal 37a of shift register 37 and the succeeding portion of the $L_{sum}$ signal $(l_3+l_4)$ appears at terminal 38a of shift register 38. The expanded $L_{sum}$ signal shown in FIG. 3D is obtained at terminal 41a. The digital-to-analog converter 43 converts the expanded $L_{sum}$ signal in digital format into an expanded $L_{sum}$ signal in analog format which appears at terminal 43b and also at channel output terminal 26, as shown in FIG. 3D.

The operation of switch 36 and switch 42 by switch control blocks 48 and 49 respectively, and the application of clock in and clock out pulses to the third and fourth shift registers 39 and 40 over a time period $t_1-t_4$ of four horizontal lines is identical to the operation of switch 35 and switch 41 by switch control blocks 48 and 49 respectively, and the application of clock in and clock out pulses to the first and second shift registers 37 and 38 over a time period $t_1-t_4$ of four horizontal lines. Accordingly, one portion of the $L_{diff}$ signal $(l_1-l_2)$ appears at terminal 39a of shift register 39 and the succeeding portion of the $L_{diff}$ signal appears at terminal 40a of shift register 40. The expanded $L_{diff}$ signal is obtained at terminal 42a. The digital-to-analog converter 44 converts the expanded $L_{diff}$ signal in digital format into an expanded $L_{diff}$ signal in analog format which appears at terminal 44b and also at channel output terminal 27, as shown in FIG. 3F.

Next, the hue channel 22 will be described. The hue channel 22 comprises an input analog-to-digital converter 61, a one-line delay circuit 62, an adder 63, a switch 64, a shift register 65, another shift register 66, another switch 67, an output digital-to-analog converter 68. The input analog-to-digital converter 61 has an input terminal 61a, an output terminal 61b consisting of eight output lines corresponding to 8 bits of binary word and a control terminal 61c. The analog-to-digital converter 61 converts an analog hue signal at input terminal 61a into a digital hue signal at its output terminal 61b. Each line of the hue signal is divided into 910 elements or values in response to a 4×3.58 clocking signal applied at control terminal 61c and each value has a resolution of 256 levels represented by eight bits. The one-line delay circuit 62 includes a shift register having eight channels and has an input terminal 62a consisting of eight lines, each line connected to the input of a respective channel, an output terminal 62b consisting of eight lines, each line connected to the output of a respective channel, and a control or clocking terminal 62c consisting of eight lines, each line connected to a respective channel. The adder 63 has a pair of input terminals 63a and 63b, each consisting of eight input lines, an output terminal 63c consisting of eight output lines and a control terminal 63d. The switch 64 has a pole terminal 64a consisting of eight lines, a first contact terminal 64b consisting of eight lines, a second contact terminal 64c consisting of eight lines and a third contact terminal 64d unconnected to provide an unconnected position for the switch 64 for reasons to be described below. The shift register 65 has eight channels and has an input terminal 65a consisting of eight lines, each line being connected to the input of a respective channel, an output terminal 65b consisting of eight output lines, each line connected to the output of a respective channel, a control or clock terminal 65c consisting of eight lines, each line connected to a respective channel for clocking the channels at one rate of 4×3.58 MHz, and a control or clock terminal 65d consisting of eight lines, each line connected to a respective channel for clocking the channels at another rate of 2×3.58 MHz. The shift register 66 is identical to shift register 65 and has an input terminal 66a, an output terminal 65b, and a pair of clocking control terminals 65c and 65d. The switch 67 has a pole terminal 67a consisting of eight lines, a first contact 67b consisting of eight lines and a second contact terminal 67c consisting of eight lines. The output digital-to-analog converter 68 has an input terminal 68a consisting of eight lines, an output terminal 68b and a control terminal 68c.

While not shown for reasons of simplifying the drawing, terminal 47b is connected to terminal 61c of analog-to-digital converter 61, to terminal 62c of one-line delay circuit 62, to terminal 63d of adder 63. Also, while not shown, terminal 47c is connected to terminal 68c of digital-to-analog converter 68. The linkage 48c of the first switch controller 48 is linked to the pole of switch 64 to control the position thereof. The linkage 49c of second switch controller 49 is linked to the pole of switch 67 to control the position thereof. Also, while not shown, output terminals 50e, 50f, 50g and 50h of shift register control 50 are connected to terminals 65c and 65d of shift register 65, and terminals 66c and 66d of shift register 66, respectively.

The input terminal 61a of analog-to-digital converter 61 is connected to terminal 13 of camera 11. The output terminal 61b of the analog-to-digital converter 61 is connected to the input terminal 62a of one-line delay circuit 62. The output terminal 61b of the analog-to-digital converter 61 is also connected to input terminal 63b of adder 63. The output of one-line delay circut 62 is connected to input terminal 63a of adder 63. The output terminal 63c of adder 63 is connected to pole terminal 64a of switch 64. First contact terminal 64b of switch 64 is connected to input terminal 65a of shift register 65. Second contact terminal 64c of switch 64 is connected to input terminal 66a of shift register 66. The output terminal 65b of shift register 65 is connected to first contact terminal 67b of switch 67. Output terminal 66b of shift register 66 is connected to second contact terminal 67c of switch 67. The pole contact terminal 67a of switch 67 is connected to input terminal 68a of digital-to-analog converter 68. The output terminal 68b of digital-to-analog converter 68 is connected to output terminal 28.

The operation of the hue channel 22 of FIG. 1 will now be described in connection with FIGS. 3A–3D wherein it is assumed that the lines $l_1$–$l_{10}$ represent successive lines of the hue signal. The operation of the hue channel 22 is identical to the operation of luminance channel including only the components which are involved in the addition function, namely, analog-to-digital converter 31, one-line delay circuit 32, adder 33, switch 35, shift registers 37 and 38, switch 41 and digital-to-analog converter 43. The analog hue signal appearing at terminal 13 is shown in FIG. 3A. The hue signal of FIG. 3A is converted into digital form by the analog-to-digital converter 61. The hue signal is delayed by the period of one line by the one-line delay circuit 62. The delayed hue signal of FIG. 3B is applied to one terminal 63a of the adder 63. The undelayed hue signal, shown at FIG. 3A, is applied to the other terminal 63b of the adder 63. Thus, at the output of the adder 63, a signal is obtained in digital format which is the sum of successive pairs of lines of the hue signal. The sequence of sums would be $l_1+l_2$, $l_2+l_3$, $l_3+l_4$, etc. In accordance with the present invention, the sequence of $l_1+l_2$, $l_3+l_4$, $l_5+l_6$, etc. is utilized for the hue channel. The manner in which this sequence is selectively obtained will be readily apparent from the operation of the shift registers 65 and 66 to be described below.

The operation of switch 64 and switch 67 by switch control blocks 48 and 49, respectively, and the application of clock in and clock out pulses to the shift registers 65 and 66 will now be described over a time period $t_1$–$t_4$ of four horizontal lines. Reference is made particularly to FIGS. 8A and 8B which show the time of application of clock in and clock out pulses to shift registers 65 and 66, respectively. During the time $t_1$ of a first horizontal line of video data, switch 64 is in its first position with terminal 64a connected to terminal 64b. Also, during time $t_1$, 4×3.58 MHz pulses are applied to terminal 65c of shift register 65 thereby clocking into the shift register 65 a line of hue data, as shown in FIG. 8A. Also, during time $t_1$, switch 67 is in its second position with terminal 67a connected to terminal 67c. Also, during time $t_1$, 2×3.58 MHz pulses are applied to terminal 66d of shift register 66 thereby clocking out of shift register 66 into terminal 67a one-half of a line of video data previously clocked into this shift register, as shown in FIG. 8B.

During the time $t_2$ of a second horizontal line of hue data, switch 64 is moved to its third position with terminal 64a connected to terminal 64d and hence disconnected from input terminls 65a and 66a of shift registers 37 and 38. Also, during time $t_2$, no clock pulses are applied to either terminals 64c or 64d of shift register 64. Also, during time $t_2$ switch 67 remains in its second position and 2×3.58 MHz pulses continue to be applied to terminal 66d of shift register 66 thereby clocking out of the shift register 66 into termnal 67a the other half of the line of hue data previously clocked into this shift register.

During the time $t_3$ of a third horizontal line of hue data, switch 64 is moved to its second position with terminal 64a connected to terminal 64c. Also, during time $t_3$, 4×3.58 MHz pulses are applied to terminal 66c of shift register 66 thereby clocking another line of hue data into shift register 66. Also, during time $t_3$, switch 67 is in its first position with terminal 67a connected to terminal 67b. Also, during time $t_3$, 2×3.58 MHz pulses are applied to terminal 65d thereby clocking out of shift register 65 into pole terminal 67a one-half of a line of the hue data which had been clocked in during time $t_1$.

During time $t_4$ of a fourth horizontal line of video data, switch 64 is moved to its third position with terminal 64a connected to terminal 64d and hence disconnected from input terminals 65a and 66a of the registers 65 and 66. Also, during time $t_4$, no pulses are applied to either terminals 66c or 66d of shift register 66. Also, during time $t_4$, switch 67 remains in its first position with pole contact 67a of switch 67 connected to first contact 67b and 2×3.58 MHz pulses continue to be applied to terminal 65d of shift register 65 thereby clocking out of shift register 65 into terminal 67a the other half of the line of video data clocked in during time $t_1$.

The cycle of operation is repeated during the next four horizontal line times $t_5$-$t_8$, etc. Thus, one line of hue data is clocked into shift register 65 at a 4×3.58 MHz rate during one line time and is thereafter clocked out of shift register 65 at a 2×3.58 MHz rate during two line times, thereby stretching the time coordinate of the hue data by a factor of 2. Two horizontal line times later, the same operation is repeated in shift register 66. Thus, at terminal 67a of switch 67 appear lines of hue data, the time coordinate of each of which has been stretched by a factor of 2.

If the first line of hue data at the output of adder 63 is the sum of the first and second lines of video applied at the input thereof, the second line of data at the output of adder 63 would be the sum of the second and third lines applied to the input thereof. As the next line of hue data desired in accordance with the system of the present invention is the sum of the third and fourth lines, the disconnection of terminal 64a of switch 64 from terminals 64b and 64c in the manner explained above provides this result.

Thus, one portion of the $H_{sum}$ signal ($l_1+l_2$, $l_3+l_4$, etc.) appears at terminal 65a of shift register 65 and the succeeding portion of the $H_{sum}$ signal ($l_3+l_4$, $l_3+l_4$, etc.) appears at terminal 66a of shift register 66. The expanded $H_{sum}$ signal shown in FIG. 3D is obtained at terminal 67a. The digital-to-analog converter 68 converts the expanded $H_{sum}$ signal in digital format into an expanded $H_{sum}$ signal in analog format which appears at terminal 68b and also at channel output terminal 28.

Next, the color saturation channel 23 will be described. The color saturation channel 23 is identical in structure and operation to the structure and operation of the hue channel 22. The color saturation channel 23 comprises an input analog-to-digital converter 71, a one-line delay cirucit 72, an adder 73, a switch 74, a shift register 75, another shift register 76, another switch 77, an output digital-to-analog converter 78. The input analog-to-digital converter 71 has an input terminal 71a, an output terminal 71b consisting of eight output lines corresponding to 8 bits of binary word and a controlled terminal 71c. The analog-to-digital converter 71 converts an analog saturation signal at input terminal 71a into a digital saturation signal at its output terminal 71b. Each line of the saturation signal is divided into 910 elements or values in response to a 4×3.58 clocking signal applied at control terminal 71c and each value has a resolution of 256 levels represented by eight bits. The one-line delay circuit 72 includes a shift register having eight channels and has an input terminal 72a consisting of eight lines, each line connected to the input of a respective channel, an output terminal 72b consisting of eight lines, each line connected to the output of a respective channel, and a control or clocking terminal 72c consisting of eight lines, each line connected to a respective channel. The adder 73 has a pair of input terminals 73a and 73b, each consisting of eight input lines, an output terminal 73c consisting of eight output lines and a control terminal 73d. The switch 74 has a pole terminal 74a consisting of eight lines, a first contact terminal 74b consisting of eight lines, a second contact terminal 74c consisting of eight lines and a third contact terminal 74d unconnected to provide an unconnected position for the switch 74 for reasons to be described below. The shift register 75 has eight channels and has an input terminal 75a consisting of eight lines, each line being connected to the input of a respective channel, an output terminal 75b consisting of eight output lines, each line connected to the output of a respective channel, a control or clock terminal 75c consisting of eight lines, each line connected to a respective channel for clocking the channels at one rate of 4×3.58 MHz, and a control or clock terminal 65d consisting of eight lines, each line connected to a respective channel for clocking the channels at another rate of 2×3.58 MHz. The shift register is identical to shift register 75 and has an input terminal 76a, an output terminal 75b and a pair of clocking control terminals 75c and 75d. The switch 77 has a pole terminal 77a consisting of eight lines, a first contact 77b consisting of eight lines and a second contact terminal 77c consisting of eight lines. The output digital-to-analog converter 78 has an input terminal 78a consisting of eight lines, an output terminal 78b and a control terminal 78c.

While not shown for reasons of simplifying the drawing, terminal 47b is connected to terminal 71c of analog-to-digital converter 71, to terminal 72c of one-line delay circuit 72, to terminal 73d of adder 73. Also, while not shown, terminal 47c is connected to terminal 78c of digital-to-analog converter 78. The linkage 48c of the first switch controller 48 is linked to the pole of switch 74 to control the position thereof. The linkage 49c of second switch controller 49 is linked to the pole of switch 77 to control the position thereof. Also, while not shown, output terminals 50e, 50f, 50g and 50h of shift register control 50 are connected to terminals 75c and 75d of shift register 75, and terminals 76c and 76d of shift register 76, respectively.

The input terminal 71a of analog-to-digital converter 71 is connected to terminal 14 of camera 11. The output terminal 71b of the analog-to-digital converter 77 is connected to the input terminal 72a of one-line delay circuit 72. The output terminal 71b of the analog-to-digital converter 71 is also connected to input terminal 73b of adder 73. The output of one-line delay circuit 72 is connected to inut terminal 73a of adder 73. The output terminal 73c of adder 73 is connected to pole terminal 74a of switch 74. First contact terminal 74b of switch 74 is connected to input terminal 75a of shift register 75. Second contact terminal 74b of switch 74 is connected to input terminal 76a of shift register 76. The output terminal 75b of shift register 75 is connected to first contact temrinal 77b of switch 77. Output terminal 76b of shift register 76 is connected to second contact terminal 77c of switch 77. The pole contact terminal 77a of switch 77 is connected to input terminal 78a of digital-to-analog converter 78. The output terminal 78b of digital-to-analog converter 78 is connected to output terminal 29.

The operation of the color saturation channel 23 of FIG. 1 will now be described in connection with FIGS. 3A-3D wherein it is assumed that the lines $l_1$-$l_{10}$ represent successive lines of the saturation signal. The operation of the saturation channel 23 is identical to the operation of hue channel 22. The analog saturation signal appearing at terminal 14 is shown in FIG. 3A. The saturation signal of FIG. 3A is converted into digital form by the analog-to-digital converter 71. The saturation signal is delayed by the period of one line by the one-line delay circuit 72. The delayed saturation signal of FIG. 3B is applied to one termial 73a of the adder 73. The undelayed saturation signal, shown at FIG. 3A, is applied to the other terminal 73b of the adder 73. Thus, at the output of the adder 73, a signal is obtained in digital format which is the sum of successive pairs of lines of the hue signal. As explained above in connection with switches 64 and 67, and shift registers 65 and 66 of the hue channel, the operation of switch 74 and switch 77 of the saturation channel by switch control blocks 48 and 49 respectively, and the application of clock in and clock out pulses to the shift registers 75 and 76 provides an expanded $S_{sum}$ signal. One portion of the expanded $S_{sum}$ signal, $S_{sum}$ ($l_1 + l_2$, $l_5 + l_6$, etc.) appears at terminal 75a of shift register 75 and the succeeding portion of the expanded $S_{sum}$ signal, $S_{sum}$ ($l_3 - l_4$, $l_7 + l_8$, etc.), appears at terminal 76b of shift register 76. The expanded $S_{sum}$ signal shown in FIG. 3D is obtained at terminal 77a. The digital-to-analog converter 78 converts the expanded $S_{sum}$ signal in digital format into an expanded $S_{sum}$ signal in analog format and appears at terminal 78b and also at channel output terminal 29.

The transmission station 10 also includes a transmitter 30 to which the analog expanded $L_{sum}$ signal, the analog expanded $L_{diff}$ signal, the expanded $H_{sum}$ signal, and the analog expanded $S_{sum}$ signal appearing at respective terminals 26, 27, 28 and 29 are applied for transmission over a transmission channel to a receiving station. The transmitter 30 is shown in block diagram form in FIG. 4. The transmitter 30 comprises a 0° luminance carrier generator 151, a 90° luminance carrier generator 158, a 90° chroma carrier generator 153 and a 0° chroma carrier generator 154. The transmitter 30 also includes moculators 155, 156, 157 and 158. The transmitter 30 also includes low pass filters 161, 162, 163 and 164. The transmission channel further includes combiners or adders 165, 166 and 167. The expanded $L_{sum}$ signal appearing at terminal 26 is applied through a low pass filter 161 to one terminal of the modulator 155 to the other terminal of which the 0° luminance carrier is applied to provide at the output of modulator the 0° luminance carrier modulated in amplitude by the expanded $L_{sum}$ signal. The expanded $L_{diff}$ signal appearing at terminal 27 is applied through low pass filter 162 to one terminal of the modulator 156, to the other terminal of which the 90° luminance carrier is applied to provide at the output of the modulator 156 the 90° luminance carrier modulated in amplitude by the expanded $L_{diff}$ signal. The two modulated carriers are combined in the adder 165. The expanded $H_{sum}$ signal appearing at terminal 28 is applied through low pass filter 163 to one terminal of the modulator 157, to the other terminal of which the 90° chroma carrier is applied from generator 153 to produce at the output thereof the 90° chroma carrier modulated in amplitude by the expanded $H_{sum}$ signal. The expanded $S_{sum}$ signal appearing at terminal 29 is applied through low pass filter 164 to one terminal of the modulator 158, to the other terminal of which the 0° chroma carrier is applied to produce at the output thereof the 0° chroma carrier modulated in amplitude by the expanded $S_{sum}$ signal. The two modulated carriers are combined in the adder 166. The modulated carrier appearing at the output of adder 165 and the modulated carrier appearing at the output of adder 166 are combined in adder 167 to provide an output after filtering by bandpass filter 168 suitable for transmission over a suitable transmission channel such as a transmission line or a radio relay system. Any other technique whereby a single carrier is modulated by two independent signals is acceptable, for example, a modulation method in which the carrier amplitude is modulated by a first signal while the phase is modulated by a second signal.

The filters 161, 162, 163 and 164 have cutoff frequencies, of $f_c$, $f_c/3$, $f_c/12$, and $f_c/12$, respectively. These filters are provided to limit the bandwidth of the signals to predetermined values thereby limiting the bandwidth required in the transmission channel for the transmission thereof. The total bandwidth required by transmitter 30 is substantially equal to the sum of the bandwidths of its input signals. In order to allocate the total bandwidth efficiently, these signals are separately band limited by filters 161, 162, 163 and 164 so as to optimize subject image quality for a particular total bandwidth. It has been discovered that subjective picture quality is best when less bandwidth is allocated to the luminance difference signal than to the luminance sum signal. Accordingly, filter 162 has a lower cutoff frequency than filter 161. If a pair of lines were separately transmitted, they would require equal bandwidth, but in this invention the total bandwidth of the analog expanded $L_{sum}$ signal and analog expanded $L_{diff}$ signal can be only slightly larger than that required for the signal of one line. The difference signal is inherently lower bandwidth than the sum signal as sharpest transitions (vertical edges in an image) give rise to the highest frequency components, but verticl edges imply that the two lines in a line pair are very similar, which implies that the difference in amplitude of a line pair is close to zero. Also, it has been discovered that the difference signal can be bandwidth limited much more than might be expected without causing extensive artifacts.

The receiving station 80 includes a receiver 85 which demodulates the modulated carriers sent by the transmitter and provides at its output terminals 91, 92, 93 and 94 the expanded $L_{sum}$ signal, the expanded $L_{diff}$ signal, the expanded $H_{sum}$ signal, and the expanded $S_{sum}$ signal, respectively. The receiver 85 is shown in block diagram of FIG. 5. The receiver 85 comprises, a 0° luminance local oscillator 171, a 90° luminance local oscillator 172, a 90° chroma local oscillator 173, a 0° chroma local oscillator 174. Means for providing these oscillations can be any of the means used in the prior art synchronous demodulators. Receiver 85 also includes demodulators 175, 176, 177 and 178. The receiver further includes low pass filters 181, 182, 183 and 184. The luminance and the chroma modulated carriers received over a transmisson channel from the transmitter 30 of FIG. 1 are applied to the demodulators 175, 176, 177 and 178. The 0° luminance local oscillator 171 synchronously demodulates the expanded $L_{sum}$ signal appearing on the luminance carrier and provides at the output thereof the expanded $L_{sum}$ signal which is filtered by the low pass filter 181 and appears at terminal 91. The 90° luminance local oscillator 172 synchronously demodulates the expanded $L_{diff}$ signal appearing on the luminance carrier and provides at the output thereof the expanded $L_{diff}$ signal which is low pass filtered by low pass filter 182 and appears at output terminal 92. The signal from the 90° chroma local oscillator 173 applied to the demodulator 177 synchronously demodulates the expanded $H_{sum}$ signal on the chroma carrier and provides at the output thereof the expanded $H_{sum}$ signal which is filtered by low pass filter 183 and appears at output terminal 93. The signal from the 0° chroma local oscillator 174 applied to the demodulator 178 demodulates the chroma carrier to provide at the output of the demodulator 178 the expanded $S_{sum}$ signal which is filtered in the low pass filter 184 and the filtered output appears at terminal 94.

The transmitting station 10 of FIG. 1 also includes a sync encoder 45 which in response to vertical synchronization signal provides a coded output which is combined with or added to the expanded $L_{sum}$ signal in adder 46 for transmission over the transmission channel to the receiving station 80. At the receiving station 80 a sync decoder 95 is selectively responsive to the code to provide at the outputs 96, 97 and 98 thereof a vertical synchronization signal, a horizontal synchronization signal and 3.58 MHz signal, respectively, for utilization at the receiving station. The sync encoder 45, shown in block diagram form in FIG. 6, includes a code generator 191. The code generator 191 provides a particular code in response to the vertical synchronization signal. The code is mixed with the expanded $L_{sum}$ signal in adder 46 for transmission with the expanded $L_{sum}$ signal to a receiving station. The sync decoder is shown in the block diagram of FIG. 7.

Referring now to FIG. 2 there is provided a receiving station 80 including a receiver 85 having output terminals 91, 92, 93 and 94. The receiver 85 receives the transmission sent by the transmitter of FIG. 1, demodulates the carriers and provides at terminal 91 an expanded $L_{sum}$ signal, at terminal 92 an expanded $L_{diff}$ signal, at terminal 93 an expanded $H_{sum}$ signal, and at terminal 94 an expanded $S_{sum}$ signal. There is also provided a sync decoder 95 having an input terminal connected to output terminal 91 of receiver 85 and having output terminals 96, 97, and 98. The sync decoder circuit is shown in the block diagram of FIG. 7. The sync decoder 95 includes a detector 193, a phase locked loop 194 and a timing cirucit generator 195. In response to a code appearing along with the luminance signal at terminal 91 of the receiver 85, the detector 193 provides an output which is utilized to synchronize the phase locked loop 194. The output of the phase locked loop 194 controls the timing circuit generator 195 which develops a vertical synchronization signal at terminal 96, a horizontal synchronization signal at terminal 97 and a 3.58 MHz signal at terminal 98. These signals are all in synchronism with the corresponding vertical synchronization signal, the horizontal synchronization signal and the 3.58 MHz signal at terminals 17, 18 and 19, respectively, at the transmission station.

The apparatus 80 includes four processing channels 8, 82, 83 and 84. Channel 81 processes the expanded $L_{sum}$ signal at terminal 91 into one portion (shown in FIG. 3I) of a reconstituted L or luminance signal, shown in FIG. 3K, at terminal 86. Channel 82 processes the expanded $L_{diff}$ signal at terminal 92 into the other portion (shown in FIG. 3J) of the reconstituted L or luminance signal. Channel 83 processes the expanded $H_{sum}$ signal at terminal 93 into a reconsistuted hue or H signal at terminal 87. Channel 84 processes the expanded $S_{sum}$ signal at terminal 94 into a reconstituted saturation signal at terminal 88.

First, the luminance channels 81 and 82 will be described. The luminance channel 81 comprises an input analog-to-digital converter 101, switch 102, a first shift register 103, a second shift register 104, a switch 105, an arithmetic unit 106, a switch 108 and an output digital-to-analog converter 107. The input analog-to-digital converter 101 has an input terminal 101a, an output terminal 101b consisting of eight output lines corresponding to 8 bits of a binary word and a controlled terminal 101c. The analog-to-digital converter 101 converts analog expanded $L_{sum}$ signal at input terminal 101 into a digital signal at its output terminal 101b. Each line of the luminance signal is divided into 910 elements or values in response to a 2×3.58 clocking signal applied at control terminal 101c and each value has a resolution of 256 levels represented by eight bits. The switch 102 has a pole terminal 102a consisting of eight lines, a first contact terminal 102b consisting of eight lines, and a second contact terminal 102c consisting of eight lines. The shift register 103 has eight channels and has an input terminal 103a consisting of eight lines, each line being connected to the input of a respective channel, an output terminal 103b consisting of eight output lines, each line connected to the output of a respective channel, a control or clocking terminal 103c consisting of eight lines, each line connected to a respective channel for clocking the channels at one rate of 2×3.58 MHz, and a control or clocking terminal 103d consisting of eight lines, each line connected to a respective channel for clocking the channels at another rate of 4×3.58 MHz. The second shift register 104 is identical to first shift register 103 and has an input terminal 140a, an output terminal 104b, a pair of clocking control terminals 104c and 104d. The switch 105 has a pole terminal 105a consisting of eight lines, a first contact 105b consisting of eight lines and a second contact terminal 105c consisting of eight lines. The arithmetic unit 106 has a pair of input terminals 106a and 106b, each consisting of eight input lines, an output terminal 106c consisting of eight output lines and three control terminals 106d, 106e and 106f. The switch 108 has a pole terminal 108a, a first contact terminal 108b and a second contact terminal 108c. The output digital-to-analog converter 107 has an input terminal 107a consisting of eight lines, an output terminal 107b and a clocking control terminal 107c. The luminance channel 82 comprises an input analog-to-digital converter 111, a switch 112, a third shift register 113, a fourth shift register, a switch 115. The input analog-to-digital converter 111 has an input terminal 111a, an output terminal 11b consisting of eight output lines corresponding to 8 bits of a binary word and a controlled terminal 111c. The analog-to-digital converter 111 converts analog expanded $L_{diff}$ signal at input terminal 111a into a digital signal at its output terminal 111b. Each line of the luminance signal is divided into 910 elements or values in response to a 2×3.58 clocking signal applied at control terminal 111c and each value has a resolution of 256 levels represented by eight bits. The switch 112 has a pole terminal 112a consisting of eight lines, a first contact terminal 102b consisting of eight lines, and a second contact terminal 112c consisting of eight lines. The third shift register 113 is identical to first shift register 103 and has an input terminal 113a, an output terminal 113b and a pair of clock control terminals 113c and 113d. The fourth shift register 114 is identical to the first shift register 103 and has an input terminal 114a, an output terminal 114b and a pair of clocking terminals 114c and 114d. The switch 115 has a pole terminal 115a consisting of eight lines, a first contact terminal 115b consisting of eight lins and a second contact terminal 115c consisting of eight lines.

The apparatus 80 also includes a multiplier 121 having an input terminal 121a and a pair of output terminals 121b and 121c. Input terminal 121a is connected to input terminal 98 at which a signal of 3.58 MHz appears. At terminal 121b, a clocking signal of 4×3.58 MHz is provided and at output terminal 121c a signal of 2×3.58 MHz is provided. Terminal 121b is connected to terminal 125c of shift register control 125, to terminal 106f of arithmetic unit 106, and to terminal 107c of digital-to-analog converter 107. Terminal 121c is connected to terminal 101c of analog-to-digital converter 101, to terminal 111c of analog-to-digital converter 111 and to terminal 125d of shift register control 125. The apparatus also includes a first switch control 122 having input terminals 122a and 122b and having a linkage indicated by dotted line 122c linking the poles of switches 102 and 112 to control the position thereof, and a second switch controller 123 having a pair of input terminals 123a and 123b and having a linkage indicated by dotted line 123c linking the poles of switches 105 and 115 to control the position thereof. The apparatus also includes a third switch controller 124 having input terminals 124a and 124b, an output terminal 124c, and having a linkage indicated by dotted line 124d linked to the pole of switch 108 to control the position thereof. Terminals 122a, 123a and 124a are connected to terminal 96 at which vertical synchronization signals appear. Terminals 122b, 123b and 124b are connected to terminal 97 at which horizontal synchronization signals appear. Terminal 124c is connected to pole terminal 108a of switch 108. Contact terminal 108b and contact terminal 108c are connected to add terminal 106d and substract terminal 106e of arithmetic unit 106, respectively. The apparatus 80 also includes a shift register control 125 having input terminals 125a, 125b, 125c and 125d, and output terminals 125e, 125f, 125g and 125h. Input terminals 125a, 125b, 125c and 125d are connected to terminals 96, 97 of sync decoder 95 and terminals 121b and 121c of multiplier 121, respectively. Output terminals 125e, 125f, 125g and 125h are connected to terminals 103c, 103d of shift register 103, and terminals 104c and 104d of shift register 104, respectively. Also, while not shown for reasons of simplifying the drawing, output terminals 125e, 125f, 125g and 125h are also connected to terminals 113c, 113d of shift register 113, and terminals 114c and 114d of shift register 114, respectively.

The input terminal 101a of analog-to-digital converter 101 is connected to terminal 91 of receiver 85. The output terminal 101b of the analog-to-digital converter 101 is connected to pole terminal 102a of switch 102. First contact terminal 102b of switch 102 is connected to input terminal 103a of first shift register 103. Second contact terminal 102c of switch 102 is connected to input terminal 104a of second shift register 104. The output terminal 103d of shift register 103 is connected to first contact terminal 105b of switch 105. Output terminal 104b of shift register 104 is connected to second contact terminal 105c of switch 105.

The input terminal 111a of analog-to-digital converter 111 is connected to terminal 92 of receiver 85. The output terminal 112b of the analog-to-digital converter 112 is connected to pole terminal 112a of switch 112. First contact terminal 112b of switch 112 is connected to input terminal 113a of third shift regiter 113. Second contact terminal 112c of switch 112 is connected to input terminal 114a of fourth shift register 114. The output terminal 113b of third shaft register 113 is connected to first contact terminal 115b of switch 115. The output terminal 114b of fourth shift register 114 is connected to second contact terminal 115c of switch 115. The pole contact terminal 105a of switch 105 is connected to input terminal 106a of arithmetic unit 106. The pole contact terminal 115a of switch 115 is connected to input terminal 106b of arithmetic unit 106. The output terminal 106c of arithmetic unit 106 is connected to the input terminal 107a of digital-to-analog converter 107. The output terminal 107b of digital-to-analog converter 107 is connected to output terminal 86.

The operation of the luminance channels 81 and 82 of FIG. 2 will now be described in connection with FIGS. 3D-3K which show diagrams of amplitude, symbolically indicated, versus time drawn to a common time scale of signals occurring at various points in the system of FIG. 2. The point of occurrence of a signal of FIGS. 3D-3K is referenced in FIG. 2 by a literal designation corresponding to the literal designation of the figure reference. The analog signal appearing at terminal 91 is shown in FIG. 3D. The analog signal of FIG. 3D is converted into digital format by the analog-to-digital converter 101. The output of the analog-to-digital converter 101 is applied to pole terminal 102a of switch 102. The analog signal appearing at terminal 92 is shown in FIG. 3F. The analog signal of FIG. 3F is converted into digital format by analog-to-digital converter 111. The output of the analog-to-digital converter 111 is applied to pole terminal 112a of switch 112. A line of luminance data $l_1 + l_2$ occurring during time $t_3 + t_4$, as shown in FIG. 3D, is written into first shift register 103 at a rate of 2×3.58 MHz and read out twice at a rate of 3.58 MHz during time $t_5 + t_6$. Another line of luminance data $l_3 + l_4$ *occurring during a time of* $t_5 + t_6$, as shown in FIG. 3D, is read into the second shift register 104 at a rate of 2×3.58 MHz and read out twice at a rate of 4×3.58 MHz during time $t_7 + t_8$. The combined outputs of shift registers 103 and 104 is shown in FIG. 3G. The manner in which the signal of FIG. 3G is obtained will be readily apparent from the operation of the first and second shift registers 103 and 104 to be described below.

The operation of switch 102 and switch 105 by switch control blocks 122 and 123, respectively, and the application of clock in and clock out pulses to the first and second shift registers 103 and 104 by means of shift register control 125 will now be described over a time period $t_1 - t_4$ of four horizontal lines. Reference is made particularly to FIGS. 9A and 9B which show the time of application of clock in and clock out pulses to shift registers 103 and 104, respectively. During the time $t_1 + t_2$ of a line of video data $l_1 + l_2$, shown in FIG. 3D, switch 102 is in its first position with terminal 102a connected to terminal 102b. Also, during time $t_1+t_2$, 2×3.58 MHz pulses are applied to terminal 103c of shift register 103. Thus the line of video data $l_1+l_2$ is clocked into shift register 103 as shown in FIG. 9A. Also, during time $t_1+t_2$, switch 105 is in its second position with terminal 105a connected to terminal 105c. Also, during time $t_1+t_2$, 4×3.58 MHz pulses are applied to terminal 104d of shift register 104 thereby clocking out of shift register 104 into terminal 105a twice in succession the line of video data previously clocked into this shift register, as shown in FIG. 9B and also shown in FIG. 3G.

During the time $t_3+t_4$ of a second line of video data $l_3+l_4$ shown in FIG. 3D, switch 102 is moved to its second position with terminal 102a connected to terminal 102c. Also, during time $t_3+t_4$, 2×3.58 MHz pulses are applied to terminal 104c of shift register 104. Thus the line of video data $l_3+l_4$ is clocked into shift register 104, as shown in FIG. 9B. Also, during time $t_3+t_4$, switch 105 is in its first position with terminal 105a connected to terminal 105b. Also, during time $t_3+t_4$, 4×3.58 MHz pulses are applied to terminal 103d thereby clocking out of shift register 103 into pole terminal 105a twice in succession the line of video data $l_1+l_2$ which had been clocked into this shift register during time $t_1+t_2$, as shown in FIG. 9A and also in FIG. 3G. The cycle is repeated during the next four line times $t_5-t_8$, etc. Thus, one line of video data $(l_1+l_2)$ is clocked into shift register 103 at a 2×3.58 MHz rate during time $t_1+t_2$ and during time $t_3+t_4$ the line of luminance data $l_1+l_2$ is clocked out twice of shift register 103 at a 4×3.58 MHz rate, thereby compressing the time coordinate of the luminance data $l_1+l_2$ by a factor of 2. Two line times $t_3+t_4$ later, the same operation is repeated in shift register 104. Thus, at terminal 105a of switch 105 appears lines of luminance data, i.e. $l_1+l_2$, $l_1+l_2$, $l_3+l_4$, $l_3+l_4$, etc., the time coordinate of each line of which has been compressed by a factor of 2 and repated, as shown in FIG. 3G.

The operation of switch 112 and switch 115 by switch control blocks 122 and 123, respectively, and the application of clock in and clock out pulses to the third and fourth shift registers 113 and 114 over a time period $t_1-t_4$ of four horizontal lines is identical to the operation of switch 102 and switch 105 by switch control blocks 122 and 123, respectively, and the application of clock in and clock out pulses to the first and second shift registers 103 and 104 over a time period $t_1-t_4$ of four lines. Accordingly, at terminal 115a of switch 115 appears a sequence of lines of luminance data, i.e. $l_1-l_2$, $l_1-l_2$, $l_3-l_4$, $l_3-l_4$, etc., the time coordinate of each of which has been compressed by a factor of 2 and repeated, as shown in FIG. 3H.

The signal of FIG. 3G is applied to terminal 106a of arithmetic unit 106 and the signal of FIG. 3H is applied to terminal 106b of arithmetic unit 106. In response to a control signal from third switch control 124 applied through switch 108 to add terminal 106d during one line time, the lines $l_1+l_2$ and $l_1-l_2$ are added to provide the line $2\times l_1$, as shown in FIG. 3I. In response to a control signal from third switch control 124 applied through switch 108 to subtract terminal 106e during a succeeding line time, the lines $l_1+l_2$ and $l_1-l_2$ are subtracted to provide the line $2\times l_2$, as shown in FIG. 3J. The signals of FIGS. 3I and 3J are combined in the arithmetic unit 106 and appear at the output terminal 106c thereof. The digital-to-analog converter 107 converts the combined signal in digital format into a reconstituted video signal in analog format as shown in FIG. 3K.

Figure 10A:
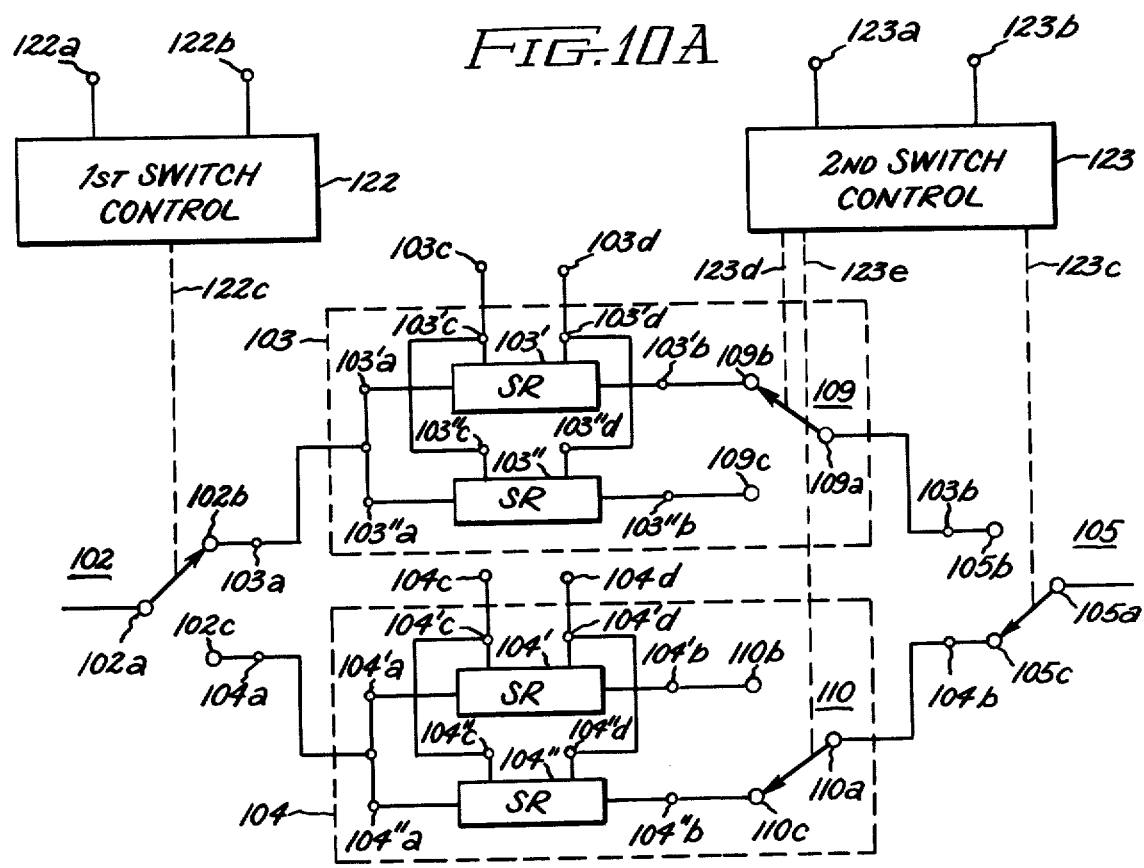

To obtain two readouts out of the shift register 103, the shift register block 103 is constituted of two shift registers 103' and 103'', each identical to the shift register 103 as described, and a switch 109, as shown in FIG. 10A. The elements of FIG. 10A identical to the elements of FIG. 2 are identically designated. The shift register 103' has an input terminal 103'a, an output terminal 103'b, and clocking terminals 103'c and 103'd. The shift register 103'' has an input terminal 103''a, an output terminal 103''b and clocking terminals 103''c and 103''d. The switch 109 has a pole terminal 109a, a first contact terminal 109b, and a second contact terminal 109c. The input terminals 103'a and 103''a are connected together and to terminal 103a. Output terminal 103'b is connected to terminal 109b. Output terminal 103''b is connected to terminal 109c. Terminals 103'c and 103''c are connected to terminal 103c. Terminals 103'd and 103''d are connected to terminal 103d. Terminal 109a is connected to terminal 103b. Linkage element 123d of second switch control 123 links with pole of switch 109 to control the position of the switch 109.

Also, to obtain two readouts of the shift register 104, the shift register block 104 is constituted of two shift registers 104' and 104'', each identical to the shift register 104 as described, and a switch 110, as shown in FIG. 10A. The shift register 104' has an input terminal 104'a, an output terminal 104'b, and clocking terminals 104'c and 104'd. The shift register 104'' has an input terminal 104''a, an output terminal 104''b and clocking terminals 104''c and 104''d. The switch 110 has a pole terminal 110a, a first contact terminal 110b, and a second contact terminal 110c. The input terminals 110'a and 110''a are connected together and to terminal 104a. Output terminal 104'b is connected to terminal 110b. Output terminal 104''b is connected to terminal 110c. Terminals 104'c and 104''c are connected to terminal 104c. Terminals 104'd and 104''d are connected to terminal 104d. Terminal 110a is connected to terminal 104b. Linkage element 123e of second switch control 123 links with pole of switch 110 to control the position of the switch 110.

In operation of the shift register circuits 103 and 104 of FIG. 10A, with switch 102 in its first position with pole 102a connected to first terminal 102b, the same video data is read into shift registers 103' and 103'' and with switch 105 in its second position with pole contact 105a connected to second contact terminal 105c, the identical video data which has previously been read into shift registers 104' and 104'' is first read out of shift register 104' and then out of shift register 104'' by setting the switch 110 in its first position with pole contact 110a connected to first contact terminal 110b and then to its second position with pole contact 110a connected to second contact terminal 110c. Over the next cycle with switch 102 in its second position with pole 102a connected to second terminal 102c and with switch 105 in its first position with pole 105a connected to first terminal 105a, the shift registers 103' and 103'' are similarly read out twice while identical video data is read into shift registers 104' and 104''.

Figure 10B:
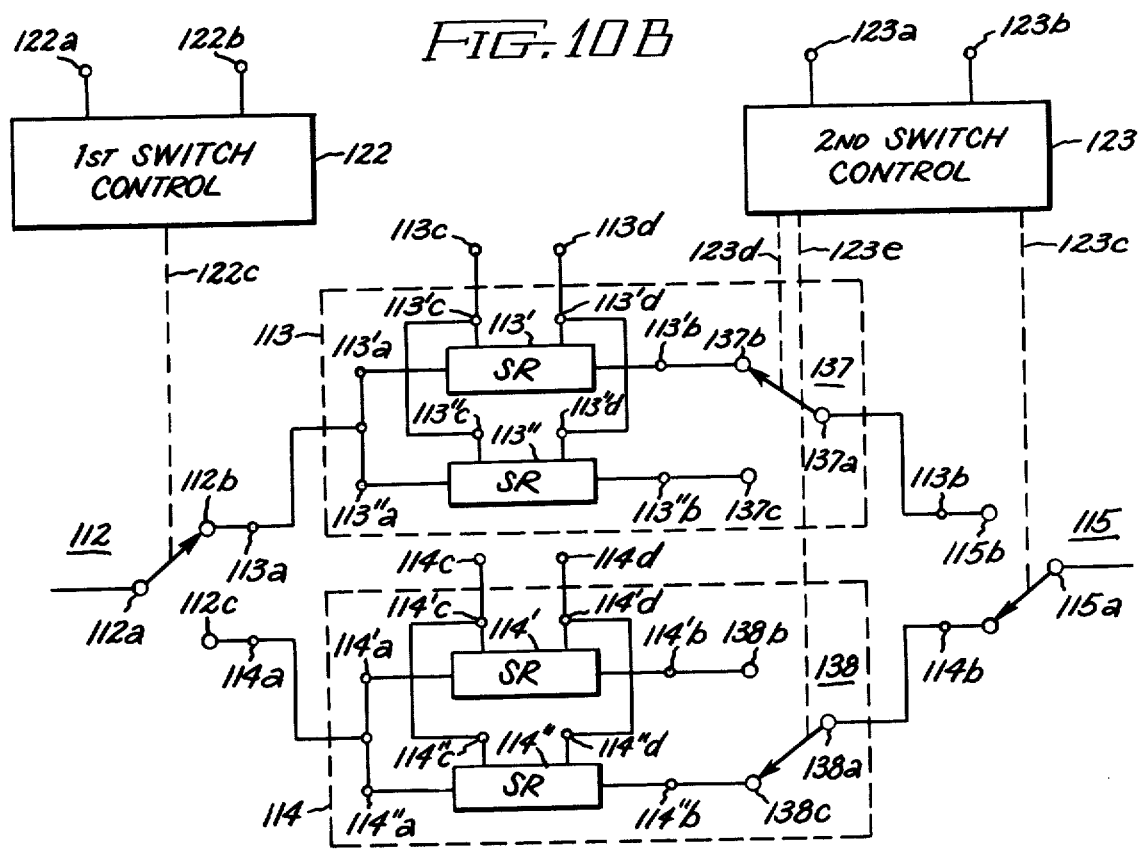

The circuit structure and operation of shift registers 113 and 114 of FIG. 10B are identical to the circuit structure and operation of respective shift registers 103 and 104 of FIG. 10A. To obtain two readouts of the shift register 113, the shift register block 113 is constituted of two shift registers 113' and 113'', each identical to the shift register 113 as described, and a switch 137, as shown in FIG. 10B. The elements of FIG. 10B identical to the elements of FIG. 2 are identically designated. Also, to obtain two readouts of the shift register 114, the shift register block 114 is constituted of two shift registers 114′ and 114″, each identical to the shift register 114 as described, and a switch 138, as shown in FIG. 10A. The elements of FIG. 10A identical to the elements of FIG. 2 are identically designated.

Figure 10C:
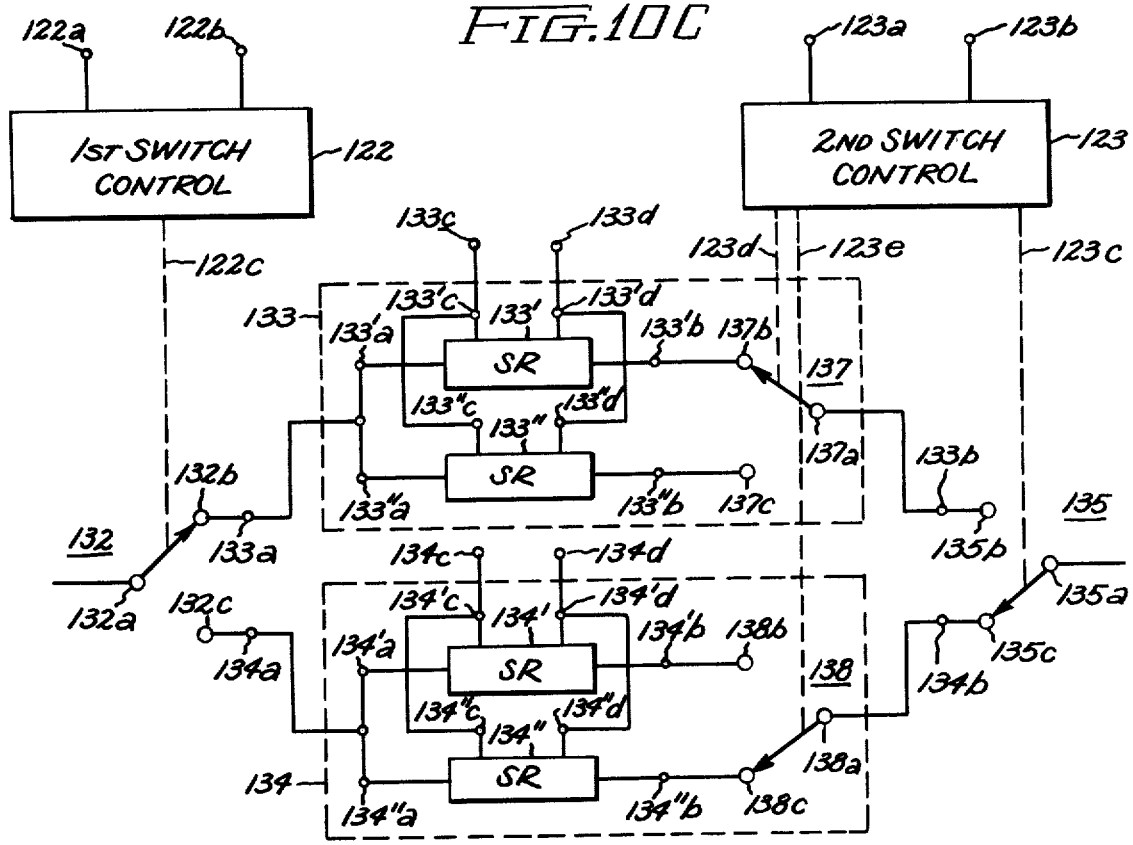
Figure 10D:
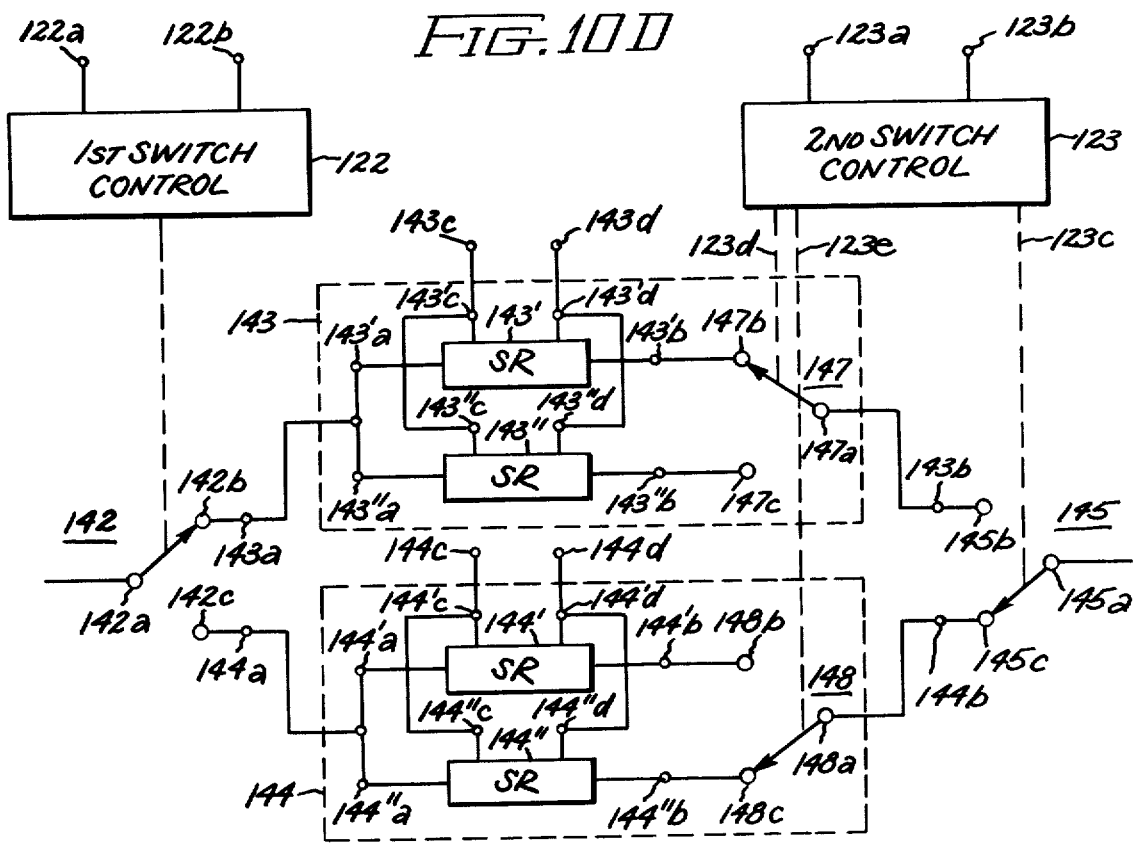

The circuit structure and operation of shift registers 133 and 134 of FIG. 2 and of FIG. 10C to be described below are identical to the circuit structure and operation of respective shift registers 103 and 104 of FIG. 10A. The circuit structure and operation of shift registers 143 and 144 of FIG. 10D and of FIG. 2 to be described below are identical to the circuit structure and operation of respective shift registers 103 and 104 of FIG. 10A.

Next, the hue channel 83 will be described. The hue channel 83 comprises an input analog-to-digital converter 131, switch 132, a shift register 133, shift register 134, switch 135, and an output digital-to-analog converter 136. The input analog-to-digital converter 131 has an input terminal 131a, an output terminal 131b consisting of eight output lines corresponding to 8 bits of a binary word and a control terminal 131c. The analog-to-digital converter 131 converts an analog expanded $H_{sum}$ signal at input terminal 131a into a digital signal at its output terminal 131b. Each of the lines of the hue signal is divided into 910 elements or values in response to a 2×3.58 clocking signal applied at control terinal 131c and each value has a resolution of 256 levels represented by eight bits. The switch 132 has a pole terminal 132a consisting of eight lines, a first contact terminal 132b consisting of eight lines, and a second contact terminal 132c consisting of eight lines. The shift register 133 has eight channels and has an input terminal 133a consisting of eight lines, each line being connected to the input of a respective channel, an output terminal 133b consisting of eight output lines, each line connected to the output of a respective channel, a control or clocking terminal 133c consisting of eight lines, each line connected to a respective channel for clocking the channels at one rate of 2×3.58 MHz, and a control or clocking terminal 133d consisting of eight lines, each line connected to a respective channel for clocking the channels at another rate of 4×3.58 MHz. The shift register 134 is identical to first shift register 133 and has an input terminal 134a, an output terminal 134b, a pair of clocking control terminals 134c and 134d. The switch 135 has a pole terminal 135a consisting of eight lines, a first contact 135b consisting of eight lines and a second contact terminal 135c consisting of eight lines. The output digital-to-analog converter 136 has an input terminal 136a consisting of eight lines, an output terminal 136b and a clocking control terminal 136c.

While not shown for reasons of simplifying the drawing, terminal 121c of multiplier 121 is connected to terminal 131c of analog-to-digital converter 131 and terminal 121b is connected to terminal 136c of digital-to-analog converter 136. The linkage 122c of the first switch control 123 is linked to the pole of switch 132 to control the position thereof. The linkage 123c of the second switch control 132 is linked to the pole of switch 135 to control the position thereof. Also, while not shown, output terminals 125e, 125f, 125g and 125h are also connected to terminals 133c and 133d of shift register 133, and terminals 134c and 134d of shift register 134, respectively.

The input terminal 131a of analog-to-digital converter 131 is connected to terminal 93 of receiver 85. The output terminal 131b of the analog-to-digital converter 131 is connected to pole terminal 132a of switch 132. First contact terminal 132b of switch 132 is connected to input terminal 133a of shift register 133. Second contact terminal 132c of switch 132 is connected to input terminal 134a of shift register 134. The output terminal 133d of shift register 133 is connected to first contact terminal 135b of switch 135. Output terminal 134b of shift register 134 is connected to second contact terminal 135c of switch 135. The pole contact terminal 135a of switch 135 is connected to the input terminal 136a of digital-to-analog converter 136. The output terminal 136b of digital-to-analog converter 136 is connected to output terminal 87.

The operation of the hue channel 83 of FIG. 2 will now be described in connection with FIGS. 3D and 3C wherein it is assumed that lines $l_1$–$l_{10}$ represent successive lines of the hue signal. The analog hue signal appearing at terminal 93 is shown in FIG. 3D. The analog hue signal of FIG. 3D is converted into digital format by the analog-to-digital converter 131. The output of the analog-to-digital converter 131 is applied to pole terminal 132a of switch 132. A line of hue data $l_1+l_2$ occurring during a period of 2t, where t is the period of a horizontal line of FIG. 3A, as shown in FIG. 3D, is read into shift register 133 at a rate of 2×3.58 MHz and read out twice at a rate of 4×3.58 MHz during a subsequent time 2t. Another line of video data $l_3+l_4$ occurring during a time of 2t, as shown in FIG. 3D, is read into shift register 134 at a rate of 2×3.58 MHz and read out twice at a rate of 4×3.58 MHz during a subsequent time 2t. The combined outputs of shift registers 133 and 134 is shown in FIG. 3G. Thus, the reconstituted hue signal consists of each line of the sequence of lines of FIG. 3D compressed and repeated. The manner in which the signal of FIG. 3G is obtained will be readily apparent from the operation of the first and second shift registers 133 and 134 described below.

The operation of switch 132 and switch 135 by switch control blocks 122 and 123, respectively, and the application of clock in and clock output pulses to the shift registers 133 and 134 will now be described over a time period $t_1-t_4$ of four horizontal lines. Reference is made particularly to FIGS. 9A and 9B which show the time of application of clock in and clock out pulses to shift registers 133 and 134, respectively. During the time $t_1+t_2$ of a line of hue data $l_1+l_2$, shown in FIG. 3D, switch 132 is in its first position with terminal 132a connected to terminal 132b. Also, during time $t_1+t_2$, 2×3.58 MHz pulses are applied to terminal 133c of shift register 133. Thus, the line of hue data $l_1+l_2$ is clocked into shift register 133, as shown in FIG. 9A. Also, during the time $t_1+t_2$, switch 135 is in its second position with terminal 135a connected to terminal 135c. Also, during time $t_1+t_2$, 4×3.58 MHz pulses are applied to terminal 134d of shift register 134 thereby clocking out of shift register 134 into terminal 135a twice in succession the line of hue data previously clocked into this shift register, as shown in FIG. 9B and also shown in FIG. 3G.

During the time $t_3+t_4$ of a second line of hue data $l_3+l_4$ shown in FIG. 3D, switch 132 is in its second position with terminal 132a connected to terminal 132c. Also, during time $t_3+t_4$, 2×3.58 MHz pulses are applied to terminal 134c of shift register 134. Thus, the line of hue data $l_3+l_4$ is clocked into shift register 134, as shown in FIG. 9B. Also, during time $t_3+t_4$, switch 135 is in its first position with terminal 135a connected to terminal 135b. Also, during time $t_3+t_4$, $4\times3.58$ MHz pulses are applied to terminal 133d thereby clocking out of shift register 133 into pole terminal 135a twice in succession the line of hue data $l_1+l_2$ which had been clocked into this shift register during time $t_1+t_2$, as shown in FIG. 9A and also in FIG. 3G. The cycle is repeated during the next four line times $t_5-t_8$, etc. Thus, one line of hue data ($l_1+l_2$) is clocked into shift register 133 at a $2\times3.58$ MHz rate during time $t_1+t_2$ and during time $t_3+t_4$ the line of hue data $l_1+l_2$ is clocked out of shift register 133 twice at a $4\times3.58$ MHz rate, thereby compressing the time coordinate of the hue data $l_1+l_2$ by a factor of 2. Two horizontal line times later, the same operation is repeated in shift register 134. Thus, at terminal 135a of switch 135 appears a sequence of lines of hue data, the time coordinate of each line of which has been compressed by a factor of 2 and repeated, as shown in FIG. 3G. The digital-to-analog converter 136 converts the combined hue signal in digital format into a reconstituted hue signal.

Next, the saturation channel 83 will be described. The saturation channel 84 comprises an input analog-to-digital converter 141, switch 142, shift register 143, shift register 144, switch 145, and an output digital-to-analog converter 146. The input analog-to-digital converter 141 has an input terminal 141a, an output terminal 141b consisting of eight output lines corresponding to 8 bits of a binary word and a control terminal 141c. The analog-to-digital converter 141 converts an analog expanded $S_{sum}$ signal at input terminal 131a into a digital signal at its output terminal 131b. Each of the lines of the saturation signal is divided into 910 elements or values in response to a $2\times3.58$ clocking signal applied at control terminal 131c and each value has a resolution of 256 levels repressented by eight bits. The switch 142 has a pole terminal 142a consisting of eight lines, a first contact terminal 142b consisting of eight lines, and a second contact terminal 142c consisting of eight lines. The shift register 143 has eight channels and has an input terminal 143a consisting of eight lines, each line being connected to the input of a respective channel, an output terminal 143b consisting of eight output lines, each line connected to the output of a respective channel, a control or clocking terminal 143c consisting of eight lines, each line connected to a respective channel for clocking the channels at one rate of $2\times3.58$ MHz, and a control or clocking terminal 143d consisting of eight lines, each line connected to a respectively channel for clocking the channels at another rate of $4\times3.58$ MHz. The shift register 144 is identical to first shift register 143 and has an input terminal 144a, an output terminal 144b, a pair of clocking control terminals 144c and 144d. The switch 145 has a pole terminal 145a consisting of eight lines, a first contact 145b consisting of eight lines and a second contact terminal 145c consisting of eight lines. The output digital-to-analog converter 146 has an input terminal 146a consisting of eight lines, an output terminal 146b and a clocking control terminal 146c.

While not shown for reasons of simplifying the drawing, terminal 121c of multiplier 121 is connected to terminal 141c of analog-to-digital converter 141 and terminal 121b is connected to terminal 146c of digital-to-analog converter 146. The linkage 122c of the first switch control 122 is linked to the pole of switch 142 to control the position thereof. The linkage 123c of the second switch control 123 is linked to the pole of switch 145 to control the position thereof. Also, while not shown, output terminals 125a, 125f, 125g and 125h are also connected to terminals 143c and 143d of shift register 143, and terminals 144c and 144d of shift register 134, respectively.

The input terminal 141a of analog-to-digital converter 141 is connected to terminal 94 of receiver 85. The output terminal 141b of the analog-to-digital converter 141 is connected to pole terminal 142a of switch 142. First contact terminal 142b of switch 142 is connected to input terminal 143a of shift register 143. Second contact terminal 142c of switch 142 is connected to input terminal 144a of shift register 144. The output terminal 143d of shift register 143 is connected to first contact terminal 145b of switch 145. Output terminal 144b of shift register 144 is connected to second contact terminal 145c of switch 145. The pole contact terminal 145a of switch 145 is connected to the input terminal 146a of digital-to-analog converter 146. The output terminal 146b of digital-to-analog converter 146 is connected to output terminal 88.

The operation of the saturation channel 84 of FIG. 2 will now be described in connection with FIGS. 3D and 3G wherein it is assumed that lines $l_1-l_{10}$ represent successive lines of the hue signal. The operation of the saturation channel 84 is identical to the operation of the hue channel 83. The analog saturation signal appearing at terminal 94 is shown in FIG. 3D. The analog saturation signal of FIG. 3D is converted into digital format by the analog-to-digital converter 141. The output of the analog-to-digital converter 141 is applied to pole terminal 142a of switch 142. A line of saturation data $l_1+l_2$ occurring during a period of 2t, where t is the period of a horizontal line of FIG. 3A as shown in FIG. 3D, is read into shift register 143 at a rate of $2\times3.58$ MHz and read out twice at a rate of $4\times3.58$ MHz during a subsequent time 2t. Another line of saturation data $l_3+l_4$ occurring during a time of 2t, as shown in FIG. 3D, is read into shift register 144 at a rate of $2\times3.58$ MHz and read out twice at a rate of $4\times3.58$ MHz during a subsequent time 2t. The combined outputs of shift registers 143 and 144 is shown in FIG. 3G. Thus, the reconstituted saturation signal consists of each line of the sequence of lines of FIG. 3D compressed and repeated. The manner in which the signal of FIG. 3G is obtained will be readily apparent from the operation of the first and second shift registers 143 and 144 described below.

The operation of switch 142 and switch 145 by switch control blocks 122 and 123, respectively, and the application of clock in and clock out pulses to the shift registers 143 and 144 will now be described over a time period $t_1-t_4$ of four horizontal lines. Reference is made particularly to FIGS. 9A and 9B which show the time of application of clock in and clock out pulses to shift registers 143 and 144, respectively. During the time $t_1+t_2$, of a line of saturation data $l_1+l_2$, shown in FIG. 3D, switch 142 is in its first position with terminal 142a connected to terminal 142b. Also, during time $t_1+t_2$, $2\times3.58$ MHz pulses are applied to terminal 143c of shift register 143. Thus, the line of hue data $l_1+l_2$ is clocked into shift register 143, as shown in FIG. 9A. Also, during the time $t_1+t_2$, switch 145 is in its second position with terminal 145a connected to terminal 145c. Also, during time $t_1+t_2$, $4\times3.58$ MHz pulses are applied to terminal 144d of shift register 144 thereby clocking out of shift register 144 into terminal 145a twice in succession the line of saturation data previously clocked into this shift register, as shown in FIG. 9B and also shown in FIG. 3G.

During the time $t_3+t_4$ of a second line of saturation data $l_3+l_4$ shown in FIG. 3D, switch 142 is in its second position with terminal 142a connected to terminal 142c. Also, during time $t_3+t_4$, $2\times3.58$ MHz pulses are applied to terminal 144c of shift register 144. Thus, the line of saturation data $l_3+l_4$ is clocked into shift register 144, as shown in FIG. 9B. Also, during time $t_3+t_4$, switch 145 is in its first position with terminal 145a connected to terminal 145b. Also, during time $t_3+t_4$, $4\times3.58$ MHz pulses are applied to terminal 143d thereby clocking out of shift register 143 into pole terminal 145a twice in succession the line of hue data $l_1+l_2$ which had been clocked into this shift register during time $t_1+t_2$, as shown in FIG. 9A and also in FIG. 3G. The cycle is repeated during the next four line times $t_5$-$t_8$, etc. Thus, one line of saturation data ($l_1+l_2$) is clocked into shift register 143 at a $2\times3.58$ MHz rate during time $t_1+t_2$ and during time $t_3+t_4$ the line of saturation data $l_1+l_2$ is clocked out of shift register 143 twice at a $4\times3.58$ MHz rate, thereby compressing the time coordinate of the hue data $l_1+l_2$ by a factor of 2. Two horizontal line times later, the same operation is repeated in shift register 144. Thus, at terminal 145a of switch 145 appears a sequence of lines of saturation data, the time coordinate of each line of which has been compressed by a factor of 2 and repeated, as shown in FIG. 3G. The digital-to-analog converter 146 converts the combined saturation signal in digital format into a reconstituted saturation signal.

The luminance signal L, the hue signal H and the saturation signal S appearing at terminals 86, 87 and 88, respectively, are applied along with the 3.58 MHz signal, the vertical sync signal and the horizontal sync signal from the sync decoder 95 to a suitable display device 99 for displaying the picture represented by the television signal. The display device 99 may comprise an NTSC encoder for encoding the luminance, the hue and the saturation signals, the vertical and horizontal synchronization signals, and the 3.58 MHz signal into a composite television signal, and a color receiver for converting the composite television signal into a color picture display.

While in the transmission station of FIG. 1, the switching functions required have been implemented by mechanical switches such as switch 41 operated by a second switch control 49 responsive to vertical and horizontal synchronization pulses for the timing of the actuation of the switch. Such an assemblage can be completely implemented by the use of various logic circuits.

While the transmitting station and the receiving station 80 include hard wired components such as adders, subtractors, switches, shift registers, delay lines, and various controllers therefor, it is readily apparent that a computer can be programmed to emulate the operation of the transmitting station and another computer can be programmed to emulate the operation of the receiving station.

While each of the channels of the transmission station is organized to process an analog signal at its input to and analog signal at its output by digital means, the digital processing could be eliminated to reduce the component count and complexity thereof by maintaining analog signal processing throughout each of the channels. In channel 21 the analog-to-digital converter 31 would be eliminated. The one-line delay 32 could comprise a charge coupled delay line eliminating the need for eight channels in the digital delay line 32. The adder 33 and subtractors 34 could be replaced by operational and differential amplifiers. The switch functions of switches 35 and 36 could be performed by gating circuits. Each of the shift registers 37 and 38 could be replaced by a single channel charge coupled shift register. Switch 41 could be replaced by gating circuits. Digital-to-analog converter 43 would be eliminated. Thus, analog signal processing would be maintained throughout the channel from the input terminal 12 to output terminal 26. Similarly, the other channels 22 and 23 of the transmission could be converted to enable analog signal processing throughout the channels. Also, the various channels 81, 82, 83 and 84 of the receiving station could be similarly converted to enable analog signal processing throughout the channels.

The system of the present invention makes use of the fact that in a raster scanned television system, the correlation between the luminance signals of a pair of adjacent lines is close. Because of this correlation, the difference between the luminance signals of the two lines is much smaller than either luminance signal alone, and it has less bandwidth. Accordingly, when a single carrier is amplitude modulated by the average value of two adjacent lines, or by either line, while the phase of the carrier is modulated by the difference signal, the bandwidth of the resulting signal will be comparable to that of a carrier that is amplitude modulated by a single raster line. Since two lines of information are being transmitted, however, it would be possible to take twice as much time to transmit them as when only a single line is being transmitted. Stretching the time axis in this way results in a reduction of bandwidth by a factor of about two.

While in the system of the present invention the lines of the luminance, hue and color saturation signals were expanded in time by a factor of 2 at the transmitting station, and were compressed in time by a factor of 2 at the receiving station, other expansion and compression ratios may be utilized by altering the ratio of the clock in and clock out rates of the shift registers of system, and of course, making appropriate changes in the clocking rates of the other components of the system.

In the system of the present invention at the transmitting station the sequences of luminance lines $l_1+l_2$, $l_3+l_4$, $l_5+l_6$, etc. are formed and expanded in time and the sequence of luminance lines $l_1-l_2$, $l_3-l_4$, $l_5-l_6$, etc. are also formed and expanded in time. At the receiving station the expanded sequences are compressed in time and repeated, and added and subtracted to obtain the reconstituted luminance sequence $l_1$, $l_2$, $l_3$, $l_4$, $l_5$, $l_6$, etc. This implementation of the invention is preferred for highest accuracy. The expanded luminance sequence $l_1$, $l_2$, $l_3$, $l_4$, $l_5$, $l_6$, etc. and the expanded luminance sequence $l_1-l_2$, $l_3-l_4$, $l_5-l_6$, etc. could as well have been formed at the transmitting station. At the receiving station the two sequences could have been compressed in time and repeated. The addition of the two sequences would provide $l_1$, $l_3$, $l_5$, etc. and the subtraction of the two sequences would provide $l_2$, $l_4$, $l_6$, etc. Combining the latter two sequences would provide the reconstituted luminance sequence $l_1$, $l_2$, $l_3$, $l_4$, $l_5$, $l_6$ etc. This implementation of the invention is preferred for lowest cost.

While the two cases discussed above are preferred for reasons of accuracy and simplicity, respectively, any pair of linear combinations of the two image lines which are linearly independent could be chosen for transmission, with the appropriate inverse linear combinations being employed in the reconstruction thereof.

Since the eye has relatively poor resolution for chroma information, it is not actually necessary to use the average chroma signals, $S_{sum}$ and $H_{sum}$, as indicated in FIG. 1. Instead, it is possible to use the chroma signal from either one of the two lines, or it can be derived from the two chroma signals in any other convenient way.

In the system of FIG. 1, the expanded $L_{sum}$ signal with the coded synchronization signal from sync encoder 45, the expanded difference signal, the expanded $H_{sum}$ signal, and the expanded $S_{sum}$ signal are applied to transmitter 30 for transmission. The transmission channel can be a recording media such as magnetic tape, in which case the signals can be recovered later and applied to terminals 91, 92, 93 and 94 of the receiving station 80 of FIG. 2. The transmission channel can also be a broadcast channel in which case the terminals 91-94 of the receiving station 80 can be at a remote location.

While the invention has been described in a specific embodiment, it will be understood that modifications such as those described above may be made by those skilled in the art, and it is intended by the appended claims to cover all such modifications and changes as fall within the true spirit and scope of the invention.

What is claimed is:

1. In combination:
   means for providing a luminance signal consisting of a plurality of successive lines, said plurality of lines consisting of a first set of alternate lines and a second set of alternate lines, each line having a duration of a first predetermined time,
   means for forming a plurality of successive lines of a first signal, each line of said first signal being a first linear combination of a respective line of said luminance signal in said first set of alternate lines delayed by said first predetermined time and a respective successive line of said luminance signal in said second set of alternate lines,
   means for forming a plurality of successive lines of a second signal, each line of said second signal being a second linear combination of a respective line of said luminance signal in said first set of alternate lines delayed by said first predetermined time and a respective successive line of said luminance signal in said second set of alternate lines, said second linear combination of said second signal being independent of said first linear combination of said first signal,
   means for expanding the duration of each of the lines of said first signal to a duration of a second predetermined time greater than said first predetermined time, whereby the bandwidth thereof is reduced,
   means for further limiting the bandwidth of said expanded first signal to a first predetermined value,
   means for expanding the duration of each of the lines of said second signal to a duration of said second predetermined time, whereby the bandwidth thereof is reduced,
   means for further limiting the bandwidth of said expanded second signal to a second predetermined value, said second predetermined value being less than said first predetermined value,
   means for transmitting each of the lines of said bandwidth limited and expanded first signal to a transmission channel,
   means for transmitting each of the lines of said bandwidth limited and expanded second signal to said transmission channel.

2. The combination of claim 1 in which said first linear combination is an algebraic sum and in which said second linear combination is an algebraic difference of a respective line of said luminance signal in said first set of alternate lines delayed by said first predetermined time and a respective successive line of said luminance signal in said second set of alternate lines.

3. The combination of claim 2 in which the coefficient of one of the terms of said first linear combinations is zero.

4. The combination of claim 1 in which said transmission channel is a storage medium and in which is provided,
   means for storing said bandwidth limited and expanded first signal in said storage medium,
   means for storing said expanded and bandwidth limited second signal in said storage medium,
   means for recovering said expanded and bandwidth limited first signal and said expanded and bandwidh limited second signal from said storage medium,
   means for compressing the duration of each of the lines of said expanded and bandwidth limited first signal to the duration of said first predetermined time and for repeating each of said compressed lines,
   means for compressing the duration of each of the lines of said expanded and bandwidth limited second signal to the duration of said first predetermined time and for repeating each of said compressed lines,
   means for forming a third linear combination of each line of a first set of alternate lines of said compressed and repeated first signal and a respective line of a second set of alternate lines of said compressed and repeated second signal to reconstitute a respective line of said first set of alternate lines of said luminance signal,
   means for forming a fourth linear combination of each line of said second set of alternate lines of said compressed and repeated first signal and a respective line of said first set of alternate lines of said compressed and repeated second signal to reconstitute a respective line of said second set of alternate lines of said luminance signal.

5. The combination of claim 1 in which said transmission channel is a broadcast channel and in which is provided,
   means for receiving each of the lines of said expanded and bandwidth limited first signal from said transmission channel,
   means for receiving each of the lines of said expanded and bandwidth limited second signal from said transmission channel,
   means for compressing the duration of each of the lines of said expanded and bandwidth limited first signal to the duration of said first predetermined time and for repeating each of said compressed lines,
   means for compressing the duration of each of the lines of said expanded and bandwidth limited second signal to the duration of said first predetermined time and for repeating each said compressed lines, means for forming a third linear combination of each line of a first set of alternate lines of said compressed and repeated first signal and a respective line of a second set of alternate lines of said compressed and repeated second signal to reconstitute a respective line of said first set of alternate lines of said luminance signal, means for forming a fourth linear combination of each line of said second set of alternate lines of said compressed and repeated first signal and a respective line of said first set of alternate lines of said compressed and repeated second signal to reconstitute a respective line of said second set of alternate lines of said luminance signal.

6. The combination of claim 1 in which said second predetermined time is twice said first predetermined time.

7. The combination of claim 1 in which said means for transmitting said expanded and bandwidth limited first signal to said transmission channel includes modulating a carrier in one phase with said expanded and bandwidth limited first signal, in which said means for transmitting said expanded and bandwidth limited second signal to said transmission channel includes modulating said carrier in quadrature phase with said expanded and bandwidth limited second signal, in which said means for receiving said expanded and bandwidth limited first signal includes synchronously demodulating said modulated carrier to obtain said expanded and bandwidth limited first signal, and in which said means for receiving said expanded and bandwidth limited second signal includes synchronously demodulating said modulated carrier to obtain said expanded and bandwidth limited second signal.

8. In combination:

means for providing a luminance signal consisting of a plurality of successive lines, said plurality of lines consisting of a first set of alternate lines and a second set of alternate lines, each line having a duration of a first predetermined time, means for forming a plurality of successive lines of a first signal, each line of said first signal being a first linear combination of a respective line of said luminance signal in said first set of alternate lines delayed by said first predetermined time and a respective successive line of said luminance signal in said second set of alternate lines, means for forming a plurality of successive lines of a second signal, each line of said second signal being a second linear combination of a respective line of said luminance signal in said first set of alternate lines delayed by said first predetermined time and a respective successive line of said luminance signal in said second set of alternate lines, said second linear combination of said second signal being independent of said first linear combination of said first signal, means for expanding the duration of each of the lines of said first signal to a duration of a second predetermined time greater than said first predetermined time, whereby the bandwidth thereof is reduced, means for further limiting the bandwidth of said expanded first signal to a first predetermined value, means for expanding the duration of each of the lines of said second signal to a duration of said second predetermined time, whereby the bandwidth thereof is reduced, means for further limiting the bandwidth of said expanded second signal to a second predetermined value, said second predetermined value being substantially less than said first predetermined value, means for transmitting each of the lines of said bandwidth limited and expanded first signal to a transmission channel, means for transmitting each of the lines of said bandwidth limited and expanded second signal to said transmission channel, means for providing a chrominance signal consisting of a plurality of successive lines, said plurality of successive lines consisting of a first set of alternate lines and a second set of alternate lines, each line having a duration of said first predetermined time, means for forming a plurality of lines of a third signal, each line of said third signal being derived from a respective line of said first set of alternate lines of said chrominance signal delayed by said first predetermined time and a respective successive line of said second set of alternate lines of said chrominance signal, means for expanding the duration of each of the lines of said third signal to the duration of said second predetermined time, whereby the bandwidth thereof is reduced, means for further limiting the bandwidth of said expanded third signal to a third predetermined value, said third predetermined value being substantially less than said second predetermined value, means for transmitting each of the lines of said expanded and bandwidth limited third signal over a transmission channel.

9. The combination of claim 8 in which said first linear combination is an algebraic sum and in which said second linear combination is an algebraic difference of a respective line of said luminance signal in said first set of alternate lines delayed by said first predetermined time and a respective successive line of said luminance signal in said second set of alternate lines.

10. The combination of claim 9 in which the coefficient of one of the terms of said first linear combination is zero.

11. The combination of claim 9, in which said transmission channel is a storage medium and in which is provided, means for storing said expanded and bandwidth limited first signal in said storage medium, means for storing said expanded and bandwidth limited second signal in said storage medium, means for storing said expanded and bandwidth limited third signal in said storage medium, means for recovering said expanded and bandwidth limited first signal from said storage medium, means for recovering said expanded and bandwidth limited second signal from said storage medium, means for recovering said expanded and bandwidth limited third signal from said storage medium, means for compressing the duration of each of the lines of said expanded and bandwidth limited first signal to the duration of said first predetermined time and for repeating each of said compressed lines, means for compressing the duration of each of the lines of said expanded and bandwidth limited second signal to the duration of said first predetermined time and for repeating each of said compressed lines, means for compressing the duration of each of the lines of said expanded and bandwidth limited third signal to the duration of said first predetermined time and for repeating each of said compressed lines, means for forming a third linear combination of each line of a first set of alternate lines of said compressed and repeated first signal and a respective line of a second set of alternate lines of said compressed and repeated second signal to reconstitute a respective line of said first set of alternate lines of said luminance signal, means for forming a fourth linear combination of each line of said second set of alternate lines of said compressed and repeated first signal and a respective line of said first set of alternate lines of said compressed and repeated second signal to reconstitute a respective line of said second set of alternate lines of said luminance signal.

12. The combination of claim 8 in which said transmission channel is a broadcast channel and in which are provided means for receiving each of the lines of said expanded and bandwidth limited first signal from said transmission channel, means for receiving each of the lines of said expanded and bandwidth limited second signal from said transmission channel, means for compressing the duration of each of the lines of said expanded and bandwidth limited first signal to the duration of said first predetermined time and for repeating each of said compressed lines, means for compressing the duration of each of the lines of said expanded and bandwidth limited second signal to the duration of said first predetermined time and for repeating each of said compressed lines, means for forming a third linear combination of each line of a first set of alternate lines of said compressed and repeated first signal and a respective line of a second set of alternate lines of said compressed and repeated second signal to reconstitute a respective line of said first set of alternate lines of said luminance signal, means for forming a fourth linear combination of each line of said second set of alternate lines of said compressed and repeated first signal and a respective line of said first set of alternate lines of said compressed and repeated second signal to reconstitute a respective line of said second set of alternate lines of said luminance signal, means for receiving each of the lines of said expanded and bandwidth limited third signal from said transmission channel, means for compressing the duration of each of the lines of said expanded and bandwidth limited third signal to a duration of said first predetermined time and for repeating each of said compressed lines.

13. The combination of claim 8 in which said second predetermined time is twice said first predetermined time.

14. The combination of claim 8 in which said means for transmitting said expanded and bandwidth limited third signal to said transmission channel includes modulating a carrier in one phase with said expanded and bandwidth limited third signal and in which said means for receiving said expanded and bandwidth limited signal includes synchronously demodulating said modulated carrier to obtain said expanded and bandwidth limited third signal.

15. In combination:

means for providing each of the lines of a bandwidth limited and expanded first signal, each line of said first signal being a first linear combination of a respective line of a first set of alternate lines of a luminance signal delayed by a first predetermined time and a respective successive line of a second set of alternate lines of said luminance signal, each line of said first signal being expanded to a duration of a second predetermined time greater than said first predetermined time, each of said lines being bandwidth limited, means for providing each of the lines of a bandwidth limited and expanded second signal, each line of said second signal being a second linear combination of a respective line of said first set of alternate lines of said luminance signal delayed by said first predetermined time and a respective successive line of said second set of alternate lines of said luminance signal, each line of said second signal being expanded to a duration of said second predetermined time, each of said lines being bandwidth limited, said second linear combination of said second signal being independent of said first combination of said first signal, means for compressing the duration of each of the lines of said expanded and bandwidth limited first signal to the duration of said first predetermined time and for repeating each of said compressed lines, means for compressing the duration of each of the lines of said expanded and bandwidth limited second signal to the duration of said first predetermined time and for repeating each of said compressed lines, means for forming a third linear combination of each line of a first set of alternate lines of said compressed and repeated first signal and a respective line of a second set of alternate lines of said compressed and repeated second signal to reconstitute a respective line of said first set of alternate lines of said luminance signal, means for forming a fourth linear combination of each line of said second set of alternate lines of said compressed and repeated first signal and a respective line of said first set of alternate lines of said compressed and repeated second signal to reconstitute a respective line of said second set of alternate lines of said luminance signal.

16. The combination of claim 15 in which said first linear combination is an algebraic sum and in which said second linear combination is a algebraic difference of a respective line of said luminance signal in said first set of alternate lines delayed by said first predetermined time and a respective successive line of said luminance signal in said second set of alternate lines.

17. The combination of claim 16 in which the coefficient of one of the terms of said first and second linear combinations is zero.

18. The combination of claim 15 in which said second predetermined time is twice said first predetermined time.

19. The combination of claim 15 including:

means for providing each of the lines of a bandwidth limited and expanded third signal, each line of said third signal being the sum of a line of a first set of alternate lines of a chrominance signal delayed by said first predetermined time and a successive line of a second set of alternate lines of said chrominance signal, each line of said third signal being expanded to a duration of said second predetermined time, each of said lines being bandwidth limited, means for compressing the duration of each of the lines of said bandwidth limited and expanded third signal to a duration of said first predetermined time and for repeating each of said compressed lines.

* * * * *